US010374764B2

(12) United States Patent
Liu et al.

(10) Patent No.: US 10,374,764 B2
(45) Date of Patent: *Aug. 6, 2019

(54) AGGREGATED TOUCHLESS WIRELESS FRONTHAUL

(71) Applicant: Futurewei Technologies, Inc., Plano, TX (US)

(72) Inventors: Xiang Liu, Marlboro, NJ (US); Frank Effenberger, Frisco, TX (US); Lei Zhou, Shenzhen (CN); Huafeng Lin, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/625,796

(22) Filed: Jun. 16, 2017

(65) Prior Publication Data

US 2017/0288828 A1    Oct. 5, 2017

Related U.S. Application Data

(63) Continuation of application No. 14/528,823, filed on Oct. 30, 2014, now Pat. No. 9,716,573.
(Continued)

(51) Int. Cl.
*H04W 72/12* (2009.01)
*H04L 5/00* (2006.01)
(Continued)

(52) U.S. Cl.
CPC ............ *H04L 5/0039* (2013.01); *H04L 5/001* (2013.01); *H04L 27/265* (2013.01); *H04L 27/2636* (2013.01); *H04W 72/00* (2013.01)

(58) Field of Classification Search
CPC .............. H04W 72/04; H04W 72/1273; H04L 5/0039; H04L 5/001
See application file for complete search history.

(56) References Cited

U.S. PATENT DOCUMENTS 3,319,139 A    5/1967   Rueffer
3,675,754 A    7/1972   Villemaud
(Continued)

FOREIGN PATENT DOCUMENTS

CA    2966229 A1    5/2016
CN    1457205 A    11/2003
(Continued)

OTHER PUBLICATIONS

Machine Translation and Abstract of Japanese Publication No. JP2014086994, May 12, 2014, 14 pages.
(Continued)

*Primary Examiner* — Wei Zhao
(74) *Attorney, Agent, or Firm* — Conley Rose, P.C.

(57) ABSTRACT

A method and apparatus are provided for wireless channel signals processing. An optical signal carrying an aggregated signal comprising a plurality of wireless channel signals is received over a single optical fiber link and converted into a digital signal and then processed to produce the plurality of wireless channel signals. The plurality of wireless channel signals in the aggregated signal are positioned in different non-overlapping frequency bands that span respective channel bandwidths (BWs), where a first channel BW of the respective channel BWs is different from a second channel BW of the respective channel BW.

19 Claims, 26 Drawing Sheets

Related U.S. Application Data

(60) Provisional application No. 62/011,843, filed on Jun. 13, 2014.

(51) Int. Cl.
   *H04W 72/00* (2009.01)
   *H04L 27/26* (2006.01)

(56) References Cited

U.S. PATENT DOCUMENTS

| | | |
|---|---|---|
| 3,991,273 A | 11/1976 | Bell et al. |
| 6,791,995 B1* | 9/2004 | Azenkot ............... H04B 1/707 348/E5.008 |
| 7,002,899 B2* | 2/2006 | Azenkot ........... H04N 7/17309 348/E7.07 |
| 7,382,805 B1 | 6/2008 | Raza et al. |
| 7,813,271 B2 | 10/2010 | Fourcand |
| 8,675,754 B1 | 3/2014 | Yonge, III et al. |
| 9,319,139 B2 | 4/2016 | Effenberger |
| 9,716,573 B2* | 7/2017 | Liu ...................... H04L 5/0039 |
| 9,755,779 B2 | 9/2017 | Zeng et al. |
| 2001/0030940 A1 | 10/2001 | Hellberg |
| 2004/0153942 A1 | 8/2004 | Shtutman et al. |
| 2004/0246891 A1 | 12/2004 | Kay et al. |
| 2005/0068918 A1 | 3/2005 | Mantravadi et al. |
| 2005/0163071 A1 | 7/2005 | Malladi et al. |
| 2005/0213674 A1 | 9/2005 | Kobayashi |
| 2006/0262871 A1 | 11/2006 | Cho et al. |
| 2007/0002823 A1 | 1/2007 | Skov Andersen et al. |
| 2007/0030116 A1 | 2/2007 | Feher |
| 2007/0116046 A1 | 5/2007 | Liu et al. |
| 2008/0225816 A1 | 9/2008 | Osterling et al. |
| 2009/0073922 A1 | 3/2009 | Malladi et al. |
| 2009/0304101 A1* | 12/2009 | LoPorto ................. G01D 4/004 375/260 |
| 2010/0002614 A1 | 1/2010 | Subrahmanya |
| 2010/0008312 A1 | 1/2010 | Viswanath |
| 2010/0086051 A1 | 4/2010 | Park et al. |
| 2010/0103901 A1 | 4/2010 | Miki et al. |
| 2010/0195583 A1 | 8/2010 | Nory et al. |
| 2010/0195624 A1 | 8/2010 | Zhang et al. |
| 2011/0032910 A1 | 2/2011 | Aarflot et al. |
| 2012/0044927 A1 | 2/2012 | Pan et al. |
| 2012/0057572 A1 | 3/2012 | Evans et al. |
| 2012/0114134 A1 | 5/2012 | Li et al. |
| 2012/0140683 A1 | 5/2012 | Xu et al. |
| 2012/0177372 A1 | 7/2012 | Liu et al. |
| 2012/0213095 A1 | 8/2012 | Krishnamurthy et al. |
| 2012/0219085 A1 | 8/2012 | Long et al. |
| 2012/0257896 A1 | 10/2012 | Djordjevic et al. |
| 2013/0163524 A1 | 6/2013 | Shatzkamer et al. |
| 2013/0170435 A1* | 7/2013 | Dinan ..................... H04L 45/50 370/328 |
| 2013/0294253 A1 | 11/2013 | Leroudier |
| 2013/0329633 A1 | 12/2013 | Dalela et al. |
| 2014/0003819 A1 | 1/2014 | Cho et al. |
| 2014/0064214 A1 | 3/2014 | Papasakellariou et al. |
| 2014/0161447 A1 | 6/2014 | Graves et al. |
| 2014/0192796 A1 | 7/2014 | Zhang |
| 2014/0255034 A1 | 9/2014 | Huo |
| 2014/0269639 A1 | 9/2014 | Heo et al. |
| 2014/0270759 A1 | 9/2014 | Djordjevic et al. |
| 2014/0328601 A1 | 11/2014 | Cavaliere |
| 2014/0334305 A1 | 11/2014 | Leroudier |
| 2015/0036556 A1 | 2/2015 | Imamura et al. |
| 2015/0071641 A1 | 3/2015 | Wen et al. |
| 2015/0162970 A1 | 6/2015 | Kamalizad et al. |
| 2015/0207740 A1 | 7/2015 | Jamond et al. |
| 2015/0280826 A1 | 10/2015 | Effenberger et al. |
| 2015/0326422 A1 | 11/2015 | Sagong et al. |
| 2015/0333865 A1 | 11/2015 | Yu et al. |
| 2015/0341080 A1* | 11/2015 | Yamanouchi ............ H04B 1/74 370/228 |
| 2015/0365934 A1 | 12/2015 | Liu et al. |
| 2016/0065325 A1 | 3/2016 | Cavaliere et al. |
| 2016/0204873 A1 | 7/2016 | Perez de Aranda Alonso et al. |
| 2016/0308641 A1 | 10/2016 | Zeng et al. |
| 2017/0331581 A1 | 11/2017 | Zeng et al. |

FOREIGN PATENT DOCUMENTS

| | | |
|---|---|---|
| CN | 1619969 A | 5/2005 |
| CN | 1694390 A | 11/2005 |
| CN | 1812292 A | 8/2006 |
| CN | 102572967 A | 7/2012 |
| CN | 103401613 A | 11/2013 |
| CN | 103441799 A | 12/2013 |
| JP | 2002518878 A | 6/2002 |
| JP | 2014086994 A | 5/2014 |
| KR | 20010072602 A | 7/2001 |
| RU | 2385535 C2 | 3/2010 |
| RU | 2481738 C2 | 5/2013 |
| RU | 2482635 C2 | 5/2013 |
| WO | 9613923 A1 | 5/1996 |
| WO | 2009020983 A1 | 2/2009 |
| WO | 2009102356 A1 | 8/2009 |
| WO | 2014076004 A2 | 5/2014 |

OTHER PUBLICATIONS

Foreign Communication From a Counterpart Application, Japanese Application No. 2017-517173, Japanese Office Action dated Mar. 27, 2018, 6 pages.

Foreign Communication From a Counterpart Application, Japanese Application No. 2017-517173, English Translation of Japanese Office Action dated Mar. 27, 2018, 6 pages.

Liu, X., et al., "Multiband DFT-Spread-OFDM Equalizer with Overlap-and-Add Dispersion Compensation for Low-Overhead and Low-Complexity Channel Equalization," XP055374371, OFC/NFOEC Technical Digest, Mar. 17, 2013, 3 pages.

Sundaresan, K., et al., "FluidNet: A Flexible Cloud-based Radio Access Network for Small Cells," XP055256070, MobiCom, Sep. 30-Oct. 4, 2013, 12 pages.

"On Channel Bandwidth and Inter-band CA," 3GPP TSG-RAN WG2 meeting #77, R2-120282, Feb. 6-10, 2012, 3 pages.

"Common Public Radio Interface (CPRI); Interface Specification," CPRI Specification V4.1, Interface Specification, Feb. 18, 2009, 109 pages.

Liu, C., et al., "A Novel Multi-Service Small-Cell Cloud Radio Access Network for Mobile Backhaul and Computing Based on Radio-Over-Fiber Technologies," Journal of Lightwave Technology, vol. 31, No. 17, Sep. 1, 2013, pp. 2869-2875.

Foreign Communication From a Counterpart Application, European Application No. 15806670.4, Extended European Search Report dated May 29, 2017, 8 pages.

Foreign Communication From a Counterpart Application, PCT Application No. PCT/CN2015/081279, English Translation of International Search Report dated Sep. 21, 2015, 7 pages.

Foreign Communication From a Counterpart Application, PCT Application No. PCT/CN2015/081279, English Translation of Written Opinion dated Sep. 21, 2015, 4 pages.

Office Action dated Oct. 13, 2016, 19 pages, U.S. Appl. No. 14/528,823, filed Oct. 30, 2014.

Office Action dated Jun. 15, 2016, 25 pages, U.S. Appl. No. 14/528,823, filed Oct. 30, 2014.

Notice of Allowance dated Mar. 17, 2017, 9 pages, U.S. Appl. No. 14/528,823, filed Oct. 30, 2014.

Foreign Communication From a Counterpart Application, Canadian Application No. 2952102, Canadian Office Action dated Oct. 13, 2017, 4 pages.

Foreign Communication From a Counterpart Application, Russian Application No. 2017139876, Russian Search Report dated Aug. 21, 2018, 2 pages.

Foreign Communication From a Counterpart Application, Russian Application No. 2017139876, Russian Office Action dated Aug. 22, 2018, 3 pages.

Office Action dated Aug. 9, 2018, 20 pages, U.S. Appl. No. 16/030,568, filed Jul. 9, 2018.

(56) References Cited

OTHER PUBLICATIONS

"Common Public Radio Interface (CPRI); Interface Specification," CPRI Specification V6.1, Jul. 1, 2014, 129 pages.
Liu, et al., "Aggregated Touchless Wireless Fronthaul," U.S. Appl. No. 14/528,823, filed Mar. 20, 2015, Specification 48 pages with 26 pages of drawings.
Foreign Communication From a Counterpart Application, PCT Application No. PCT/CN2016/085752, English Translation of International Search Report dated Aug. 29, 2016, 7 pages.
Foreign Communication From a Counterpart Application, PCT Application No. PCT/CN2016/085752, English Translation of Written Opinion dated Aug. 29, 2016, 4 pages.
Foreign Communication From a Counterpart Application, PCT Application No. PCT/CN2016/079297, English Translation of International Search Report dated Jul. 7, 2016, 7 pages.
Foreign Communication From a Counterpart Application, PCT Application No. PCT/CN2016/079297, English Translation of Written Opinion dated Jul. 7, 2016, 3 pages.
Foreign Communication From a Counterpart Application, European Application No. 16779606.9, Extended European Search Report dated Apr. 5, 2018, 8 pages.
Foreign Communication From a Counterpart Application, European Application No. 16810987.4, Extended European Search Report dated May 9, 2018, 7 pages.
Foreign Communication From a Counterpart Application, Russian Application No. 2017101015, Russian Office Action dated Oct. 30, 2017, 8 pages.
Office Action dated Nov. 1, 2017, 8 pages, U.S. Appl. No. 15/179,526, filed Jun. 10, 2016.
Notice of Allowance dated Mar. 19, 2018, 22 pages, U.S. Appl. No. 15/179,526, filed Jun. 10, 2016.
Office Action dated Dec. 1, 2017, 18 pages, U.S. Appl. No. 15/665,094, filed Jul. 31, 2017.
Office Action dated Oct. 6, 2016, 25 pages, U.S. Appl. No. 14/853,478, filed Sep. 14, 2015.
Notice of Allowance dated May 3, 2017, 13 pages, U.S. Appl. No. 14/853,478, filed Sep. 14, 2015.
U.S. Appl. No. 14/853,478, 39 pages, filed Sep. 14, 2015, "Digital Representations of Analog Signals and Control Words Using Different Multi-Level Modulation Formats".
Machine Translation and Abstract of Korean Publication No. KR20010072602, dated Jul. 31, 2001, 28 pages.
Foreign Communication From a Counterpart Application, Korean Application No. 10-2017-7001032, Korean Office Action dated Feb. 21, 2019, 7 pages.
Foreign Communication From a Counterpart Application, Korean Application No. 10-2017-7001032, English Translation of Korean Office Action dated Feb. 21, 2019, 5 pages.

* cited by examiner

AGGREGATED TOUCHLESS WIRELESS FRONTHAUL

CROSS-REFERENCE TO RELATED APPLICATIONS

The present application is a continuation of U.S. Non-Provisional patent application Ser. No. 14/528,823, filed Oct. 30, 2014 by Xiang Liu, et. al., and entitled "Aggregated Touchless Wireless Fronthaul," which claims priority to U.S. Provisional Patent Application 62/011,843, filed Jun. 13, 2014 by Xiang Liu, et. al., and entitled "Method and Apparatus for Aggregated Touchless Wireless Fronthaul," both of which are incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A radio access network (RAN) refers to a network between mobile devices or mobile stations, such as mobile phones, personal digital assistants (PDAs), laptops, or any user equipment, and a core network. In traditional wireless macro-cell networks and mobile macro-cell networks, an area may be divided geographically into a plurality of cells and cell sectors, each served by a wireless base station communicating to a core network. The part of the RAN between the wireless base stations and the core network is referred to as the wireless backhaul. As the demand for high-speed wireless communications continues to increase, reaching the limits of macro cells in terms of the number of locations and penetration capability in indoor or densely-populated areas, research and industry are moving towards small-cell deployments with denser and smaller cells in future wireless access networks.

Wireless fronthaul and mobile fronthaul are emerging network segments that enable a centralized-RAN (C-RAN) architecture suitable for small-cell deployments. In a C-RAN architecture, the digital baseband (BB) processing that is typically performed at wireless base stations located at remote cell sites is relocated to centralized baseband units (BBUs) located at a central site nearby a central office (CO) or core network. As such, the wireless base stations located at the remote cell sites are replaced by remote radio units (RRUs) that interface with antennas for wireless radio frequency (RF) transmissions and receptions without the digital BB processing. Wireless fronthaul refers to the part of the RAN between the RRUs and the BBUs. By relocating the digital BB processing to the centralized BBUs, the C-RAN architecture may enable resource sharing and coordinated multipoint (CoMP) processing, such as joint signal processing, joint interference mitigation, and/or joint scheduling among multiple cells, and thus may improve network performance and efficiency.

Wireless fronthaul may be enabled by optical fiber communication technologies, where optical fiber links may be employed for transporting signals and/or data between the RRUs located at the remote cell sites and the BBUs located at the central site. Some advantages of optical fiber transmissions may include low power loss, low latency, and high bandwidths (BWs). However, the employments of optical fibers and optical hardware add cost to the wireless fronthaul network. Thus, efficient usage of optical fiber links and optical hardware may be important in wireless fronthaul design.

SUMMARY

In an embodiment, the disclosure includes a receiver configured to receive over a single optical fiber link an optical signal carrying an aggregated signal comprising a plurality of wireless channel signals and convert the optical signal into an analog electric signal, wherein the plurality of wireless channel signals are positioned in different non-overlapping frequency bands that span respective channel BWs, wherein a first channel BW of the respective channel BWs is different from a second channel BW of the respective channel BWs, an analog-to-digital converter (ADC) coupled to the receiver and configured to convert the analog electric signal into a digital signal, and a digital signal processing (DSP) unit coupled to the ADC and configured to extract the plurality of wireless channel signals from the digital signal to produce the plurality of wireless channel signals that comprise the same BWs as the respective channel BWs. In some embodiments, the disclosure further includes wherein the first channel BW corresponds to a first sampling rate of a first wireless channel signal of the plurality of wireless channel signals, the second channel BW corresponds to a second sampling rate of a second wireless channel signal of the plurality of wireless channel signals; wherein the first sampling rate is different from the second sampling rate, and/or wherein the plurality of wireless channel signals are a plurality of wireless uplink (UL) channel signals; wherein the DSP unit is further configured to aggregate a plurality of wireless downlink (DL) channel signals to produce an aggregated DL signal via frequency-domain mapping (FDM), wherein the wireless DL channel signals are positioned in different second frequency bands with unchanged channel BWs in the aggregated DL signal, wherein the plurality of wireless channel signals comprise wireless channel signals that span BWs of 1.4 megahertz (MHz), 3 MHz, 5 MHz, 10 MHz, 15 MHz, 20 MHz, or combinations thereof, and/or wherein the DSP unit is further configured to extract the plurality of wireless channel signals from the signal via channel deaggregation based on a channel map, wherein the channel map comprises a mapping of the plurality of wireless channel signals to the different non-overlapping frequency bands.

In an embodiment, the disclosure includes a method for wireless channel signals processing comprising receiving over a single optical fiber link an optical signal carrying an aggregated signal comprising a plurality of wireless channel signals, converting the optical signal into an analog electric signal, wherein the plurality of wireless channel signals are positioned in different non-overlapping frequency bands that span respective channel bandwidths (BWs), wherein a first channel BW of the respective channel BWs is different from a second channel BW of the respective channel BWs, converting the analog electric signal into a digital signal, and extracting the plurality of wireless channel signals from the digital signal to produce the plurality of wireless channel signals that comprise the same BWs as the respective channel BWs. In some embodiments, the disclosure further includes wherein the first channel BW corresponds to a first sampling rate of a first wireless channel signal of the plurality of wireless channel signals, the second channel BW corresponds to a second sampling rate of a second wireless channel signal of the plurality of wireless channel signals; wherein the first sampling rate is different from the second sampling rate, wherein the plurality of wireless channel signals are a plurality of wireless UL channel signals; the method further comprising aggregating a plurality of wireless downlink channel signals to produce an aggregated DL signal via frequency-domain mapping, wherein the wireless DL channel signals are positioned in different second frequency bands with unchanged channel BWs in the aggregated DL signal, and/or wherein the plurality of wireless channel signals comprise E-UTRA channel signals that span BWs of 1.4 MHz, 3 MHz, 5 MHz, 10 MHz, 15 MHz, 20 MHz, or combinations thereof, and/or further comprising extracting the plurality of wireless channel signals from the signal via channel deaggregation based on a channel map, wherein the channel map comprises a mapping of the plurality of wireless channel signals to the different non-overlapping frequency bands.

In an embodiment, the disclosure includes a processor, and a non-transitory computer readable storage medium coupled to the processor and storing programming for execution by the processor, the programming including instructions to receive a plurality of wireless channel signals for different wireless channels, wherein the plurality of wireless channel signals comprise respective channel BWs, wherein a first channel BW of the respective channel BWs is different from a second channel BW of the respective channel BWs, and aggregate the plurality of wireless channel signals to produce an aggregated signal in which the plurality of wireless channel signals are positioned in different non-overlapping frequency bands and each of the plurality of wireless channel signals maintain the same channel BWs as the respective channel BWs. In some embodiments, the disclosure further includes wherein the first channel BW corresponds to a first sampling rate of a first wireless channel signal of the plurality of wireless channel signals, the second channel BW corresponds to a second sampling rate of a second wireless channel signal of the plurality of wireless channel signals; wherein the first sampling rate is different from the second sampling rate, and/or wherein the processor comprises multiple fast Fourier transformers (FFTs) for the respective wireless channels and a single inverse fast Fourier transformer (IFFT); wherein the processor is further configured to process samples outputted by the single IFFT such that for every M samples outputted by the single IFFT, a center M-L samples are kept, where L is an overlap length, M is a size of the single IFFT, and/or wherein the plurality of wireless channel signals comprise E-UTRA channel signals that span BWs of 1.4 MHz, 3 MHz, 5 MHz, 10 MHz, 15 MHz, 20 MHz, or combinations thereof.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
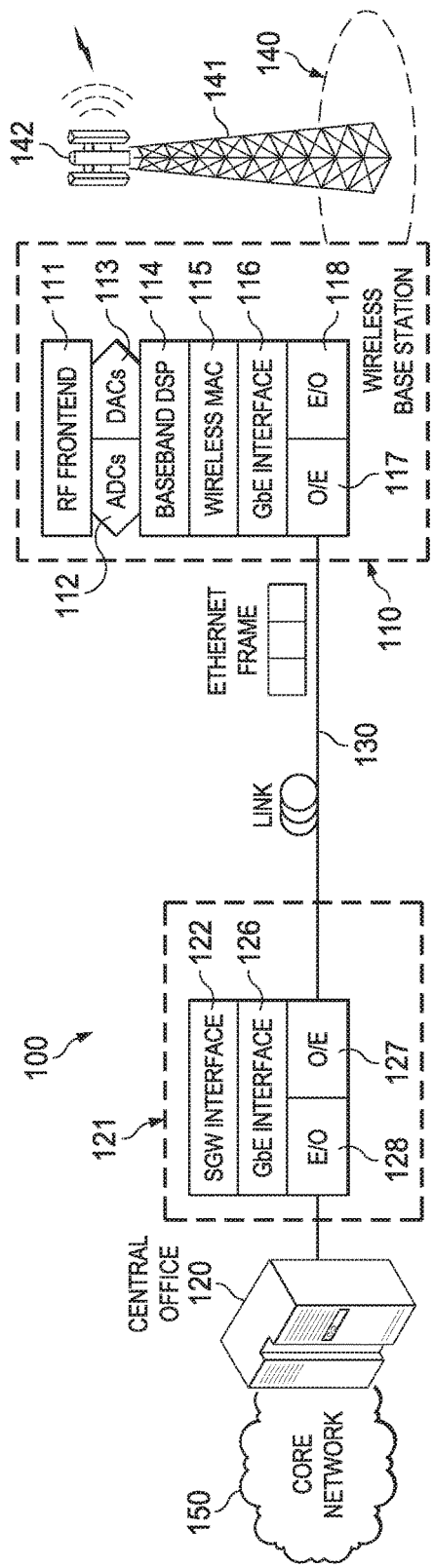
FIG. 1 is a schematic diagram of a wireless backhaul communication system.
Figure 2:
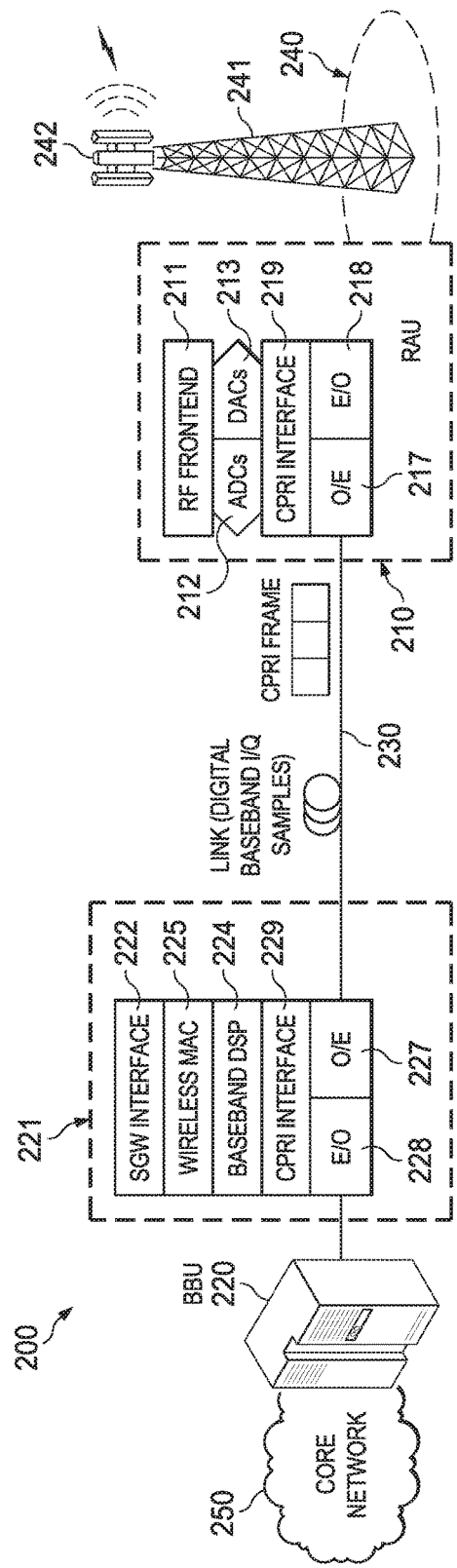
FIG. 2 is a schematic diagram of a digital baseband (BB) wireless fronthaul communication system.
Figure 3:
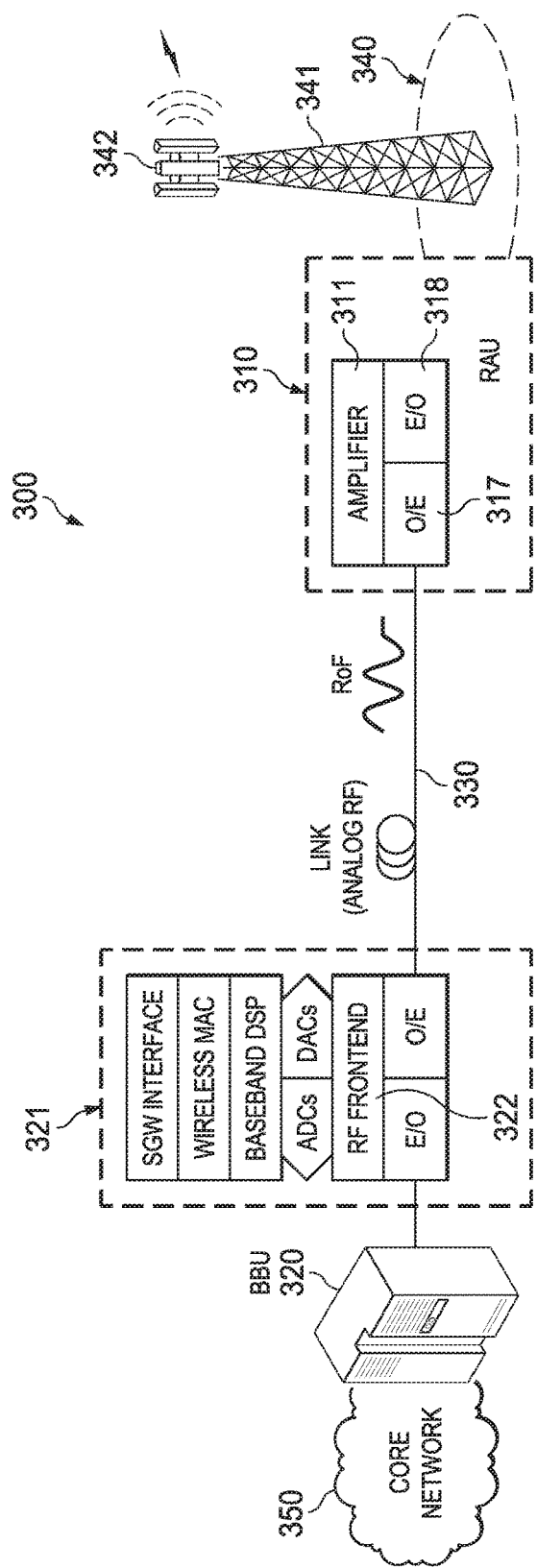
FIG. 3 is a schematic diagram of an analog wireless fronthaul communication system.

Optical-wireless integrated or bridging technologies are promising solutions for future wireless networks, such as the fifth generation (5G) wireless communication standard, in which large-scale small-cell wireless network architectures, centralized processing, and collaborative radios are becoming important topics. FIGS. 1-3 illustrate and compare the evolving wireless communication infrastructure from a wireless backhaul communication system to a wireless fronthaul communication system and the different wireless fronthaul configurations proposed by industry and research, with a focus on providing cost-effective and power-efficient wireless fronthauls to enable high-capacity wireless access.

FIG. 1 is a schematic diagram of a wireless backhaul communication system 100. The system 100 is employed in a traditional macro-cell wireless network. The system 100 comprises a wireless base station 110 communicatively coupled to a central office (CO) 120 through a link 130, which is a bi-directional link. The wireless base station 110 is located at a cell site 140 and may be installed at a fixed location, for example, at the bottom of a cell tower 141. The CO 120 connects the wireless base station 110 to a core network 150. The cell site 140 is a geographical area located at a remote location away from the CO 120 and comprises one or more cell sectors, which may be determined during network deployment by mobile operators. The cell site 140 may cover an area with a radius that ranges from about one kilometer (km) to about 20 km in a macro-cell wireless network. The cell tower 141 is an elevated structure configured to hold radio communication equipment, such as antennas 142, for communicating to mobile stations located within the coverage of the antennas 142 and/or the cell site 140. The antennas 142 are electrical devices, such as directional antennas, omnidirectional antennas, or antenna array structures, configured to convert electrical power into radio waves, and vice versa. For example, the antennas 142 may be positioned at the top of the cell tower 141 to generate a wireless radio frequency (RF) coverage in the cell site 140. The core network 150 is a central part of a network that provides network services to the users of the mobile stations. The core network 150 comprises one or more interconnected sub-networks operated by one or more network providers and/or service providers. The link 130 may be a cable link, for example, comprising coaxial cables, a free-space microwave link, for example, comprising a line-of-sight propagation path, or an optical fiber link, for example, comprising a standard single-mode fiber (SSMF) or a multi-mode fiber (MMF), and is configured to transport digital baseband (BB) signals carrying Ethernet frames between the wireless base station 110 and the CO 120. Since optical fibers may provide significantly lower power loss, higher speed, and higher BW than cables, many of the macro-cell networks are employing optical fibers instead of cables.

The wireless base station 110 comprises an RF frontend 111, one or more analog-to-digital converters (ADCs) 112, one or more digital-to-analog converters (DACs) 113, a BB digital signal processing (DSP) unit 114, a wireless media access control (MAC) unit 115, a gigabit Ethernet (GbE) interface 116, an optical-to-electrical (O/E) frontend 117, and an electrical-to-optical (E/O) frontend 118. The RF frontend 111 comprises analog electrical components, such as power amplifiers (PAs), low-noise amplifiers (LNAs), and filters. The RF frontend 111 is coupled to the antennas 142 and configured to send RF signals and receive RF signals to and from the mobile stations. The ADCs 112 and the DACs 113 are coupled to the RF frontend 111. The BB DSP unit 114 is coupled to the ADCs 112 and the DACs 113. The wireless MAC unit 115 is coupled to the BB DSP unit 114. The GbE interface 116 couples the wireless MAC unit 115 to the O/E frontend 117 and the E/O frontend 118. The GbE interface 116 is a hardware device configured to transmit Ethernet frames at a rate of about one gigabit per second (Gbps). The E/O frontend 118 comprises E/O components, such as electrical drivers, E/O converters, and a laser. The E/O frontend 118 is configured to convert one or more electrical signals into an optical signal, for example, by modulating the electrical signals onto an optical carrier signal and transmitting the optical signal to the CO 120 via the link 130. The O/E frontend 117 comprises O/E components, such as electrical drivers, O/E converters, and a laser. The O/E frontend 117 is configured to convert an optical signal into one or more electrical signals.

In an uplink (UL) direction, the ADCs 112 are configured to convert analog RF signals received from the mobile stations into digital signals, where UL refers to the transmission direction from the mobile stations towards the CO 120. In a downlink (DL) direction, the DACs 113 are configured to convert the digital signals generated by the BB DSP unit 114 into analog signals, where DL refers to the transmission direction from the CO 120 towards the mobile stations. The ADCs 112 and the DACs 113 act on individual wireless signals, and their sampling rates are determined by the signal bandwidths and the oversampling ratios in use by the wireless base station 110. For example, the ADCs 112 and the DACs 113 may operate at a sampling rate of about 30 megahertz (MHz) corresponding to about 30 megasamples per second (MSa/s) for a 20-MHz-bandwidth wireless channel with an oversampling ratio of about 1.5. The sampling resolution may be between about 4 bits and about 20 bits.

The BB DSP unit 114 is configured to perform physical layer BB DSP functions, such as signal synchronizations, modulations, demodulations, channel pre-equalizations, channel equalizations, error encoding, and error decoding. The wireless MAC unit 115 is configured to perform MAC layer processing functions, such as packet processing, error control, scheduling, and channel mappings. For example, the BB DSP functions and the wireless MAC processing functions are performed according to a particular wireless communication protocol, such as the long-term evolution (LTE) standard and the LTE-advance (LTE-A) standard as defined in the third generation partnership project (3GPP) specifications. The BB processing functions are computationally intensive and complex, thus the cost and power consumption of the wireless base station 110 may be high.

The CO 120 comprises switching components, such as server gateways (SGWs), control and management elements for access control, mobility support, and security control, and an interface unit 121 configured to interface the wireless base station 110 and the mobile stations to the core network 150 to provide a wide range of network services, such as voice calls, emails, and other Internet applications and services. The interface unit 121 comprises an SGW interface 122, a GbE interface 126, an O/E frontend 127, and an E/O frontend 128. The GbE interface 126, the E/O frontend 128, and the O/E frontend 127 are similar to the GbE interface 116, the O/E frontend 117, and the E/O frontend 118. The SGW interface 122 is configured to interface to the SGW, which routes and forwards user data packets between the mobile stations and the CO 120 received via the link 130, as well as between the CO 120 and the core network 150. The system 100 may be expensive to deploy, especially for a small-cell network due to the high-cost wireless base stations 110 distributed at the cell sites 140.

FIG. 2 is a schematic diagram of a digital BB wireless fronthaul communication system 200. The system 200 is suitable for employment in a centralized-RAN (C-RAN). The system 200 comprises a remote antenna unit (RAU) 210 communicatively coupled to a baseband unit (BBU) 220 through a link 230. The RAU 210 is located at a cell site 240 and connected to one or more antennas 242 installed close to the top of cell tower 241. The BBU 220 is located at a site near a core network 250 and connects the RAU 210 to the core network 250. The cell site 240, the cell tower 241, the antennas 242, and the core network 250 are similar to the cell site 140, the cell tower 141, the antennas 142, and the core network 150, respectively. In the system 200, the computationally-intensive BB DSP functions and the wireless MAC processing functions are separated from the RAU 210 and moved to the BBU 220.

The link 230 comprises an optical fiber, such as an SSMF or an MMF. The link 230 is configured to transport digital BB in-phase/quadrature-phase (I/Q) samples between the RAU 210 and the BBU 220 according to a common public radio interface (CPRI) protocol defined in the CPRI specification V4.1, 2009, which is incorporated herein by reference. For example, the link 230 transports CPRI frames carrying the digital BB I/Q samples.

The RAU 210 comprises an RF frontend 211, one or more ADCs 212, one or more DACs 213, a CPRI interface 219, an O/E frontend 217, and an E/O frontend 218. The RF frontend 211, the ADCs 212, the DACs 213, the O/E frontend 217, and the E/O frontend 218 are substantially similar to the RF frontend 111, the ADCs 112, the DACs 113, the O/E frontend 117, and the E/O frontend 118, respectively. The CPRI interface 219 is positioned between the ADCs 212 and the E/O frontend 218, as well as between the DACs 213 and the O/E frontend 217. The CPRI interface 219 is configured to interface with a CPRI device (not shown). The CPRI device is configured to perform CPRI protocol processing, such as physical layer signaling and line control and data link layer framing, mapping, and flow control.

In a UL direction, the RAU 210 receives UL RF signals from mobile stations via the antennas 242. The ADCs 212 convert the received UL RF signals into digital I/Q samples, the CPRI device encodes the digital I/Q samples into CPRI frames comprising binary bits, and the E/O frontend 218 converts the CPRI frames into an optical signal, for example, by employing binary on-off-keying (OOK), and sends the optical signal to the BBU 220 via the link 230. In a DL direction, the RAU 210 receives an optical signal carrying CPRI-encoded DL signals from the BBU 220 via the link 230. The O/E frontend 218 converts the received optical signal into electrical CPRI-encoded DL signals. The CPRI device decodes the CPRI encoded DL signals to produce the digital I/Q samples, and the DACs 213 convert the digital I/Q samples into analog electrical RF signals for transmission to the mobile stations via the antennas 242.

The BBU 220 comprises an internal unit 221 comprising an SGW interface 222, a wireless MAC unit 225, a BB DSP unit 224, a CPRI interface 229, an O/E frontend 227, and an E/O frontend 228. The SGW interface 222, the wireless MAC unit 225, the BB DSP unit 224, the CPRI interface 229, the O/E frontend 227, and the E/O frontend 228 are substantially similar to the SGW interface 122, the wireless MAC unit 115, the BB DSP unit 114, the CPRI interface 219, the O/E frontend 117, and the E/O frontend 118, respectively. Although a single BBU 220 is illustrated in the system 200, the system 200 may employ a centralized processing scheme by placing a pool of BBUs 220 at a site near the core network 250 to enable resource sharing and radio collaboration among the BBUs 220.

One of the drawbacks of the system 200 is the one-to-one mapping between the antennas 242 and the link 230. For example, both the RAU 210 and the BBU 220 connected via the link 230 are required for each wireless RF channel, where each RAU 210 and BBU 220 employs an optical transceiver. As such, the number of links 230 and the associated optical hardware multiply with the number of wireless RF channels and the number of antennas 242. In addition, the data throughput between the RAU 210 and the BBU 220 in the system 200 is high. For example, to support an 8×8 multiple-input and multiple-output (MIMO) LTE 20 MHz channel with an oversampling ratio of about 1.5 and a sample resolution of about 15 bits, the data throughput is about 10 Gbps including the CPRI protocol overheads, which may be about 25 percent (%) for a 8-bit symbol to 10-bit symbol mapping (8 b/10 b) line coding scheme. As such, a pair of about 10 Gbps optical transceivers is required to transport a signal with a BW of about 20 MHz. Thus, the system 200 is optical BW inefficient, as well as cost ineffective.

FIG. 3 is a schematic diagram of an analog wireless fronthaul communication system 300 as described in C. Liu, et al., "A Novel Multi-Service Small-Cell Cloud Radio Access Network for Mobile Backhaul and Computing Based on Radio-Over-Fiber Technologies," Journal of Lightwave Technology. Vol. 31, No. 17, pp. 2869-2875. September, 2013 (Liu), which is incorporated herein by reference. The system 300 comprises an RAU 310 located at a cell site 340 communicatively coupled to a BBU 320 located near a core network 350 through a link 330. The system 300 comprises a substantially similar configuration as in the system 200, and the core network 350, the cell site 340, and the link 330 are similar to the core network 250, the cell site 240, and the link 230, respectively. However, the link 330 transports analog RF signals between the RAU 310 and the BBU 320 instead of the digital BB I/Q samples as in the system 200, and thus further simplifies the processing at the RAU 310 when compared to the RAU 210.

The RAU 310 comprises one or more amplifiers 311, an O/E frontend 317, and an E/O frontend 318. The O/E frontend 317 and the E/O frontend 318 are similar to the O/E frontend 117 and the E/O frontend 118, respectively. The amplifier 311 is configured to interface to antennas 342 located at a cell tower 341, where the antennas 342 and the cell tower 341 are similar to the antennas 142 and the cell tower 141, respectively. The amplifiers 311 are RF components or devices configured to amplify the RF signals received from the mobile stations or the RF signals that are to be transmitted to the mobile stations via the antennas 342. In some embodiments, the antennas 342 are part of the RAU 310.

The BBU 320 comprises an internal unit 321 similar to the internal unit 221 at the BBU 220. However, the BBU 320 comprises an RF frontend 322 instead of a CPRI interface 229 as in the internal unit 221 since the BBU 320 is configured to send and receive RF signals to and from the RAU 310 over the link 330. The RF frontend 322 is substantially similar to the RF frontend 111 or 211.

Although the processing at the RAU 310 is simplified, the RAU 310 may employ optical and electrical components with larger bandwidths than the signal bandwidths of the analog RF signals due to the analog RF signals comprising center frequencies higher than the signal bandwidths, where the center frequencies are pre-determined according to various wireless transmission standards. Thus, the system 300 is bandwidth inefficient. Although analog frequency downshifting may be applied to improve bandwidth efficiency, the complexity of the required analog hardware becomes substantially higher. For example, to realize RF down-shifting, an analog I/Q modulator and a local oscillator may operate at a frequency equal to the amount of frequency downshifting. Due to the power loss associated with the analog I/Q modulator, the RAU 310 may additionally employ a RF power amplifier to compensate the power loss. In addition, analog I/Q modulators may have narrow operating frequency bands for frequency-shifting the analog RF signal, thus multiple dedicated I/Q modulators may be employed to shift multiple RF signals with different center frequencies. This not only increases implementation complexity, but also severely limits the system flexibility.

Figure 4:
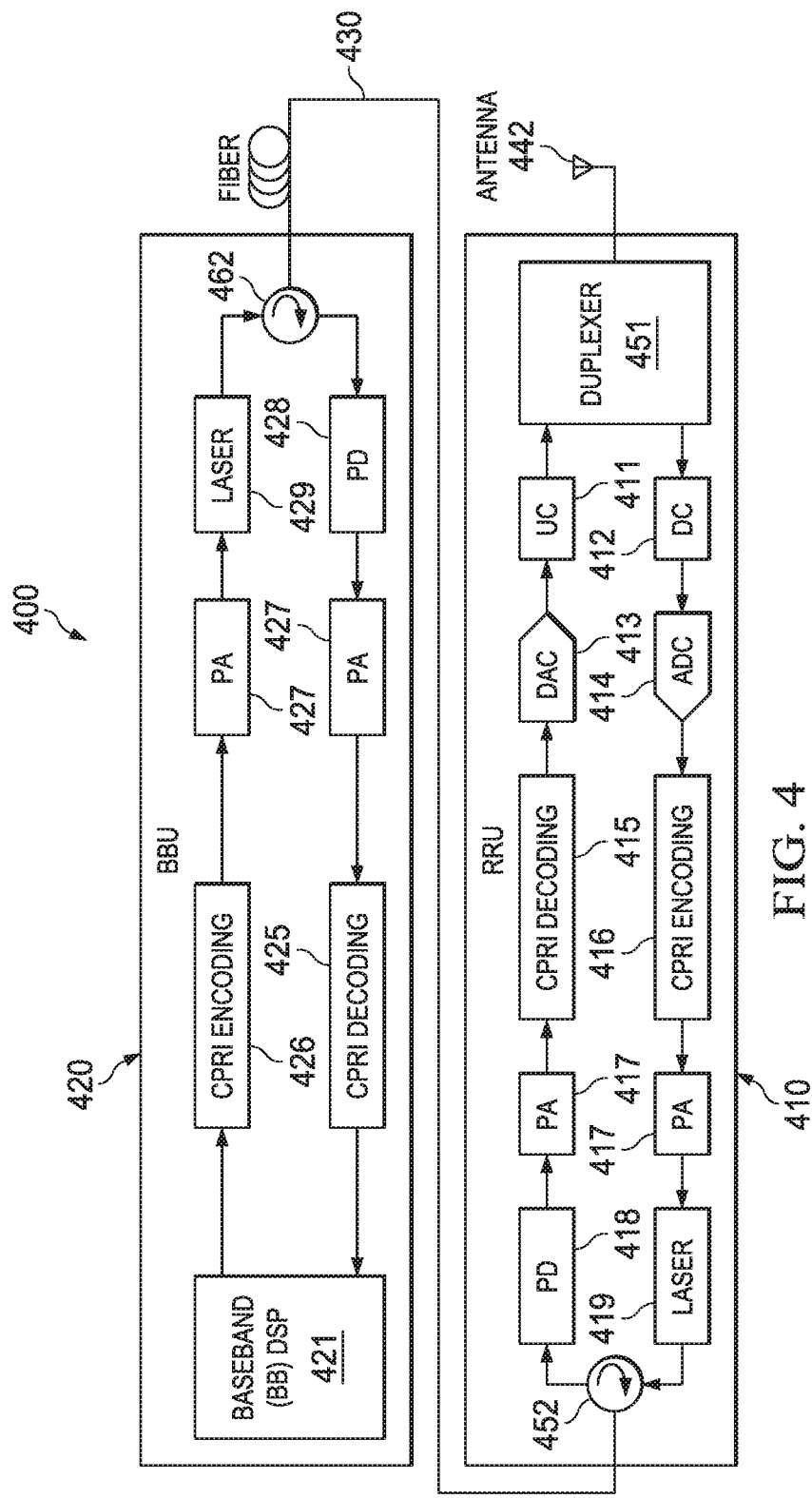
FIG. 4 is a schematic diagram of another digital BB wireless fronthaul communication system.

FIG. 4 is a schematic diagram of another digital BB wireless fronthaul communication system 400. The system 400 is similar to the system 200, and further provides a detailed view of the system 200. The system 400 comprises an RAU 410 communicatively coupled to a BBU 420 through a link 430, similar to the link 230. The RAU 410 and the BBU 420 are detailed block diagram views of the RAU 210 and the BBU 220, respectively. The RAU 410 comprises a duplexer 451, an upconverter (UC) 411, a downconverter (DC) 412, a DAC 413, an ADC 414, a CPRI encoding unit 416, a CPRI decoding unit 415, a plurality of PAs 417, a photodiode (PD) 418, a laser 419, and an optical circulator 452. The duplexer 451 is communicatively coupled to an antenna 442, similar to the antennas 142. The duplexer 451 is an RF device and/or RF component configured to separate a receiver from a transmitter while allowing the receiver and the transmitter to share the same transmission link. For example, the duplexer 451 operates in the RF band of the antenna 442 and separates the sending and receiving RF signals to and from the antenna 442.

In a UL direction at the RAU 410, the DC 412 is coupled to the duplexer 451. The DC 412 is an analog electrical device or analog electrical component configured to downconvert an analog electrical signal from a higher frequency band to a lower frequency band. For example, the DC 412 converts an RF signal received from the antenna 442 into a BB signal, where the RF signal may be centered at an RF and the BB signal centers at 0 hertz (Hz). The ADC 414 is coupled to the DC 412 and configured to convert the analog BB signals into digital signals, for example, comprising digital BB I/Q samples. The CPRI encoding unit 416 is coupled to the ADC 414 and configured to perform CPRI encoding according to the CPRI protocol, which may include both physical layer signaling and data link layer processing and control. A first of the PAs 417 is coupled to the CPRI encoding unit 416. The PAs 417 are electrical devices or electrical components configured to provide signal amplification. For example, the first PA 417 amplifies the CPRI signal to suitable voltage levels for transmission. The laser 419 is a light source, such as a direct modulation laser (DML), configured to produce an optical signal. The amplified CPRI signal is modulated onto the optical signal, for example, by employing an OOK scheme.

The optical circulator 452 couples the laser 419 and the PD 418 to the link 430. The optical circulator 452 is an optical component or optical device configured to separate optical signals traveling in an opposite direction in an optical fiber. For example, the optical circulator 452 separates the UL optical signal generated by the laser 419 from the DL optical signal received from the BBU 420 via the link 430.

In a DL direction at the RAU 410, the PD 418 is configured to convert the received DL optical signal into an electrical signal. A second of the PAs 417 is coupled to the PD 418 and configured to amplify the electrical signal into suitable voltage levels for receiver processing. The CPRI decoding unit 415 is coupled to the second PA 417 and configured to decode and convert the received signal into digital BB I/Q samples according to the CPRI protocol. The DAC 413 is coupled to the CPRI decoding unit 415 and configured to convert the digital BB I/Q samples into an analog signal. The UC 411 is coupled to the DAC 413 and configured to upconvert the analog signal from the BB back to the original RF band to provide an RF signal suitable for transmission to a mobile station via the antenna 442.

The BBU 420 comprises an optical circulator 462, a laser 429, a PD 428, a plurality of PAs 427, a CPRI encoding unit 426, a CPRI decoding unit 425, and a BB DSP unit 421. The optical circulator 462, the laser 429, the PD 428, the PAs 427, the CPRI encoding unit 426, and the CPRI decoding unit 425 are substantially similar to the optical circulator 452, the laser 419, the PD 418, the PAs 417, the CPRI encoding unit 416, and the CPRI decoding unit 415, respectively. In the UL direction, the BBU 420 is configured to receive the UL optical signal from the RAU 410. For example, the PD 428 is coupled to the optical circulator 462 and configured to convert the received UL optical signal into electrical signals. A first of the PAs 427 is coupled to the PD 428 and configured to amplify the electrical signals. The CPRI decoding unit 425 is coupled to the first PA 427 and configured to perform similar CPRI decoding as in the CPRI decoding unit 415. The BB DSP unit 421 is coupled to the CPRI decoding unit 425.

The BB DSP unit 421 may comprise one or more single-core processors, one or more multi-core processors, one or more general processors, and one or more DSP processors. The BB DSP unit 421 is configured to perform BB DSP functions for both receiving and transmitting, as well as for both UL and DL directions, for example, according to a wireless communication standard, such as LTE or LTE-A. For example, in the UL direction, the BB DSP unit 421 receives UL digital BB I/Q samples and generates data packets for transmission to a core network, such as the core network 250. In the DL direction, the BB DSP unit 421 receives data packets from the core network and generates DL digital BB I/Q samples for transmission to the RAU 410. Some examples of BB DSP functions may include, but are not limited to, frame synchronizations, data encodings, data decodings, modulations, demodulations, channel pre-equalization, channel equalization, interference mitigations, error encoding, and error decoding. In addition, the BB DSP unit 421 may perform wireless MAC layer processing, such as packet processing, scheduling, and error controls.

In the DL direction at the BBU 420, the CPRI encoding unit 426 is coupled to the BB DSP unit 421. The CPRI encoding unit 426 encodes the DL digital BB I/Q samples. A second of the PAs 427 is coupled to the CPRI encoding unit 426 and configured to amplify the CPRI encoded signal into suitable voltage levels for optical transmission. The laser 429 is coupled to the second PA 427 and configured to modulate the CPRI encoded signal onto the optical signal produced by the laser 429, for example, via an OOK modulation scheme. Similar to the system 200, the system 400 multiplies with the number of wireless RF channels or the number of antennas 442 in a wireless fronthaul network. Thus, the system 400 is optical BW inefficient and cost ineffective for wireless fronthaul employments.

Disclosed herein is an aggregated touchless wireless fronthaul communication system that is cost-effective, DSP-efficient, and optical BW-efficient. The term "aggregated" refers to the aggregation of a plurality of wireless RF channels or wireless RF channel signals transported over an optical fiber link between an RRU and a BBU. The RRU is located at a remote cell site and interfaces with a plurality of antennas, each configured to receive and/or transmit in a wireless RF channel. The BBU is located at a central site, which may comprise a pool of BBUs. The term "touchless" refers to the transportation of the wireless RF signals without any digital BB processing and preserving the signal bandwidths and/or waveform properties of the wireless RF channel signals. In the disclosed embodiments, a frequency-domain mapping (FDM) scheme is employed for channel aggregation and channel deaggregation. In the FDM scheme, input wireless and/or mobile signals are mapped to the optical frequency domain according to a pre-determined frequency map by frequency shifting the center frequencies of the input wireless and/or mobile signals and combining the frequency-shifted signals according to the pre-determined frequency map. To perform FDM, a frequency spectrum is divided into a plurality of non-overlapping frequency bands and a plurality of different signals is carried in the non-overlapping frequency bands. When the RRU receives UL signals from the antennas, the RRU aggregates the received UL signals to produce an aggregated UL signal, which carries the UL signals in non-overlapping frequency bands. The mapping of the UL signals to the non-overlapping frequency bands are based on a pre-determined channel map. When the BBU receives the aggregated UL signal, the BBU deaggregates the received aggregated UL signal by extracting the UL signals according to the pre-determined channel map. In a DL direction, the channel aggregation and channel deaggregation are similar to the UL direction, but in a reverse direction. For example, the BBU aggregates a plurality of DL BB signals, each destined for transmission over an antenna. When the RRU receives the aggregated DL signal, the RRU deaggregates the received aggregated DL signal and transmits the DL signals via corresponding antennas. The channel aggregation and the channel deaggregation may be realized in a digital domain or in an analog domain. In a digital domain, the channel aggregation and channel deaggregation may be realized in a frequency domain or in a time domain. In a frequency domain, the disclosed embodiments employ an overlap-save (OS) fast Fourier transform (FFT)/inverse-FFT (IFFT) based approach for channel aggregation and channel deaggregation. The OS FFT/IFFT based approach is DSP-efficient and may be implemented on a low-cost DSP core. The channel aggregation of multiple RF signals and/or wireless channels reduces the number of optical fiber links and optical hardware in a wireless fronthaul, and thus the disclosed embodiments provide a cost-effective, power-efficient, and optical BW-efficient wireless fronthaul. In addition, the key parameters in the channel aggregation and channel deaggregation are software configurable. Thus, the disclosed embodiments enable flexible software-defined transmission and networking at the BBUs and/or the RRUs. It should be noted that in the present disclosure, the terms remote radio head (RRH) and RRU are equivalent and are used interchangeably.

Figure 5:
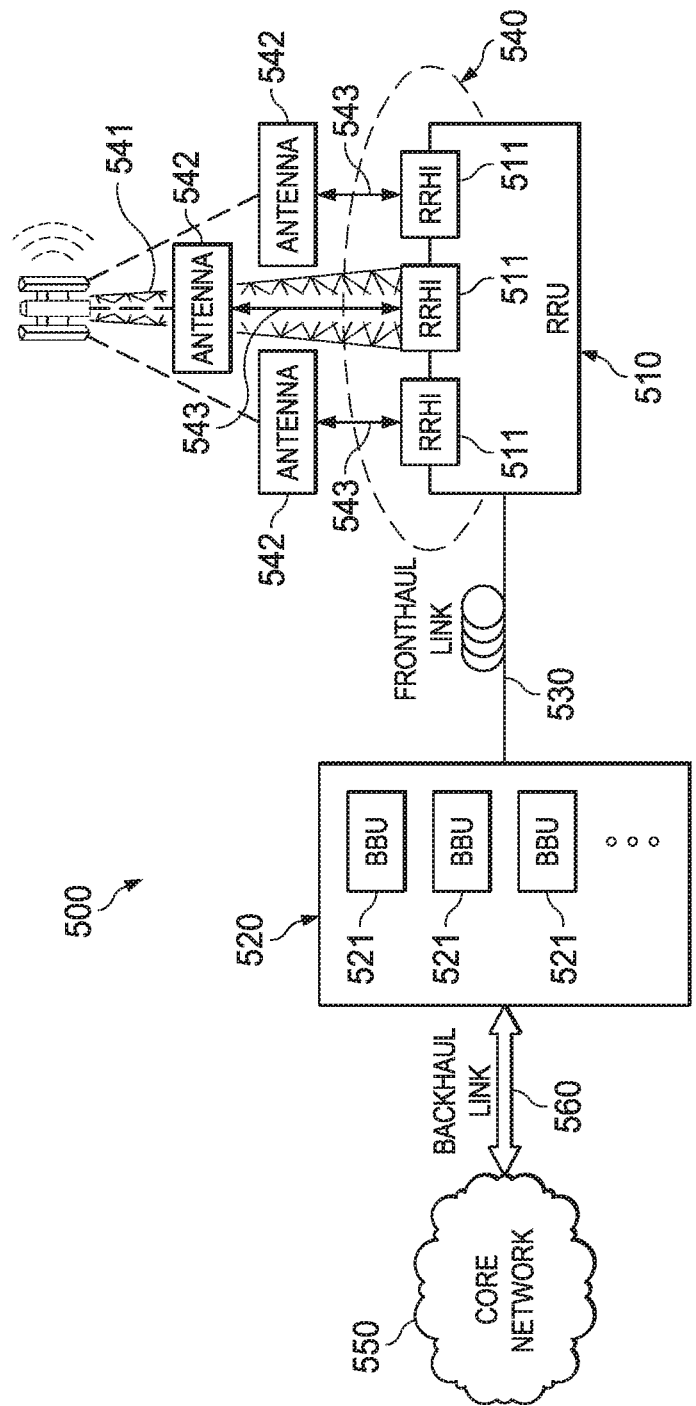
FIG. 5 is a schematic diagram of an aggregated wireless fronthaul communication system according to an embodiment of the disclosure.

FIG. 5 is a schematic diagram of an aggregated wireless fronthaul communication system 500 according to an embodiment of the disclosure. The system 500 is suitable for employment in a C-RAN and small-cell networks. The system 500 comprises an RRU 510 communicatively coupled to a BBU pool 520 through a fronthaul link 530. The RRU 510 is located at a cell site 540. For example, the RRU 510 is installed at the bottom of a cell tower 541 that holds a plurality of antennas 542. The BBU pool 520 connects the RRU 510 to a core network 550 via a backhaul link 560. The cell site 540, the cell tower 541, and the core network 550 are substantially similar to the cell site 140, the cell tower 141, and the core network 150, respectively. When the system 500 is employed in a small-cell network, the cell site 540 may comprise a substantially smaller geographical area than the cell site 140. For example, the cell site 540 may comprise an area with a radius in the order of hundreds of meters (m) instead of tens of km as in the cell site 140. The antennas 542 are substantially similar to the antennas 142, but may comprise different noise figures and power ratings depending on the cell size and cell density of the deployment area. The fronthaul link 530 may be substantially similar to the link 230. However, the fronthaul link 530 is configured to transport aggregated digital RF signals comprising digitized samples with more than two levels instead of the CPRI-encoded BB I/Q samples with two levels as in the system 200 and 400, as discussed more fully below. The backhaul link 560 is substantially similar to the fronthaul link 530, but may transport packets, such as Ethernet packets, between the BBU pool 520 and the core network 550.

The RRU 510 comprises a plurality of RRH interfaces (RRHIs) 511 communicatively coupled to the antennas 542. Each antenna 542 corresponds to a wireless RF channel associated with a particular wireless communication protocol. Some examples of wireless RF channels may include LTE channels, LTE-A channels, or other evolved universal terrestrial radio access (E-UTRA) channels as defined in the 3GPP specifications. Each wireless RF channel corresponds to a UL channel or a DL channel. The wireless RF channels may span various RF bands with various BWs. Some examples of LTE BW configurations may include 1.4 MHz, 3 MHz, 5 MHz, 10 MHz, 15 MHz, and 20 MHz. It should be noted that in the case of an MIMO transmission scheme, each input channel or each output channel is referred to as an RF channel in the present disclosure. For example, to support an 8×8 MIMO transmission scheme, the RRU 510 is configured to process 8 RF input channels and 8 RF output channels. The RRHIs 511 and the antennas 542 are connected via links 543. The links 543 may comprise optical fibers, such as SSMFs or MMFs, RF cables, or free-space microwave connections, and may carry an RF signal, for example, according to a particular RF interface protocol, in an optical signal.

The RRU 510 is configured to serve a plurality of mobile stations (not shown) located in the cell site 540 and within the coverage area of the antennas 542. Each antenna 542 may be communicating with one or more of the mobile stations. In a UL direction, the RRU 510 receives a UL RF signal from each antenna 542 via the RRHI 511 and may downconvert the UL RF signals to the BB to minimize processing rate. The RRU 510 aggregates the BB signals to produce an aggregated UL signal via an FDM scheme, which includes a pre-determined UL channel map that maps the RF channels to contiguous non-overlapping frequency bands in a frequency spectrum. For example, the RRU 510, in effect, shifts the center frequencies of the downconverted UL RF signals to the non-overlapping frequency bands according to the pre-determined UL channel map and multiplexes the frequency-shifted signals to produce the aggregated UL signal. The RRU 510 converts the aggregated UL signal into a UL optical signal and transmits the UL optical signal to the BBU pool 520.

In a DL direction, the RRU 510 receives a DL optical signal from the BBU pool 520 via the fronthaul link 530. The DL optical signal carries an aggregated DL signal comprising a plurality of DL signals positioned in different non-overlapping frequency bands, where each DL signal is destined for transmission over an antenna 542. The RRU 510 converts the DL optical signal into electrical signals and deaggregates the DL signal by channel deaggregation according to a pre-determined DL channel map. It should be noted that the pre-determined UL and DL channel maps are independent of each other, and may or may not be the same. After channel deaggregation, the BB signals of the aggregated channels are obtained. The RRU 510 upconverts the deaggregated DL signals from the BB to the original RFs that are employed for transmission over the antennas 542.

The BBU pool 520 comprises a plurality of BBUs 521 configured to perform BB DSP functions and wireless MAC processing functions according to a wireless communication protocol, channel aggregation in use, channel deaggregation, frequency upconversion, and frequency downconversion. In the UL direction, when a BBU 521 receives the UL optical signal carrying the aggregated UL signal from the RRU 510 via the fronthaul link 530, the BBU 521 converts the optical signal into electrical signals. The BBU 521 extracts the UL signals from the aggregated UL signal by channel deaggregation according to the pre-determined UL channel map. The BBU 521 performs BB DSP functions and wireless MAC processing functions to reproduce the data packets transmitted over each of the wireless RF channels and sends the data packets to the core network 550 via the backhaul link 560. It should be noted that the received aggregated UL signal may be a composite intermediate-frequency (IF) signal and an intermediate frequency-to-baseband (IF-to-BB) conversion may be implemented as part of the channel deaggregation, as discussed more fully below.

In the DL direction, the BBU 521 receives DL packets from the core network 550 via the backhaul link 560, where the packets may correspond to the wireless RF channels. The BBU 521 performs wireless MAC processing functions and BB DSP functions to produce digital BB signals. The BBU 521 then aggregates the digital BB signals by performing similar FDM as in the RRU 510 to produce the aggregated DL signal, converts the aggregated DL signal into an optical signal, and sends the optical signal to the RRU 510. It should be noted that the aggregated DL signal is a composite IF signal and a baseband-to-intermediate frequency (BB-to-IF) conversion may be implemented as part of the channel aggregation, as discussed more fully below.

Although the above embodiments describe the BBU processing with respect to a BBU 521, some of the BBU processing may be distributed over multiple BBUs 521 located at the BBU pool 520 and may additionally include joint signal processing or coordinated multipoint (CoMP) functions across multiple RRUs, similar to the RRU 510, and/or multiple antennas, similar to the antennas 542.

Figure 6:
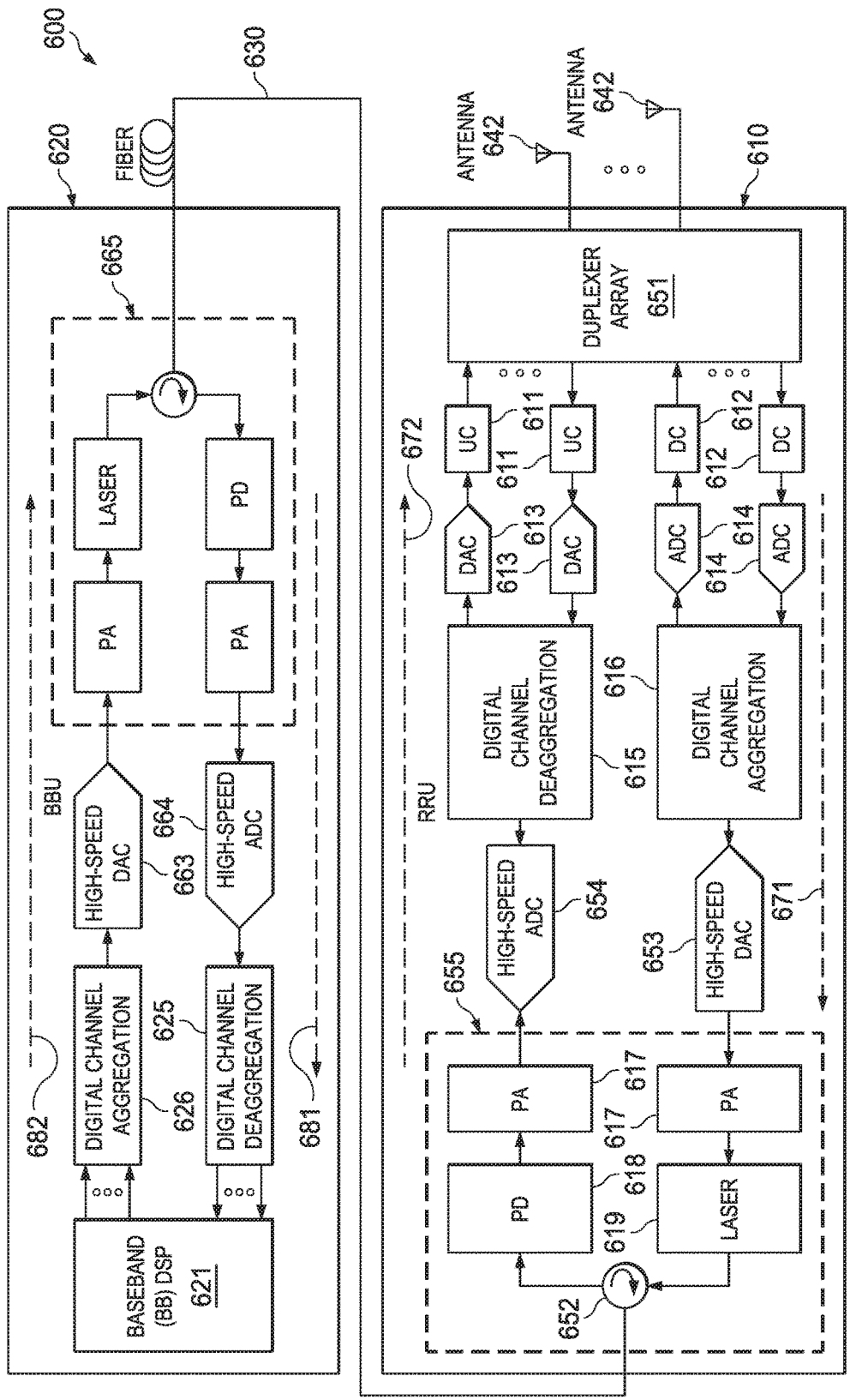
FIG. 6 is a schematic diagram of another embodiment of an aggregated wireless fronthaul communication system.

FIG. 6 is a schematic diagram of another embodiment of an aggregated wireless fronthaul communication system 600. The system 600 is similar to the system 500, and further provides a detailed view of the system 500. The system 600 comprises an RRU 610 communicatively coupled to a BBU 620 through a link 630, similar to the fronthaul link 530. The RRU 610 and the BBU 620 are detailed block diagram views of the RRU 510 and the BBU 521, respectively. In the system 600, the RRU 610 and the BBU 620 transmit and receive aggregated UL signals and aggregated DL signals carried in optical signals over the link 630. The aggregated UL signal comprises a plurality of UL channel signals positioned in adjacent non-overlapping first frequency bands, whereas the aggregated DL signal comprises a plurality of DL channel signals positioned in adjacent non-overlapping second frequency bands. For example, the system 600 employs a pre-determined UL channel map for mapping the UL channel signals to the first frequency bands and a pre-determined DL channel mapping the DL channel signals to the second frequency bands. In the system 600, both the RRU 610 and the BBU 620 perform channel aggregation and channel deaggregation in a digital domain, where the UL channel signals and DL channel signals are digitized without BB processing or signal conversions, such as CPRI signal encoding, or decoding. Thus, the waveform properties and the BWs of the BB signals are unchanged. Both the RRU 610 and the BBU 620 may employ a similar optical transmission scheme, for example, an intensity modulation (IM) scheme, at a transmitter and a similar optical detection scheme, for example, a direct-detection (DD) scheme, at a receiver.

The RRU 610 comprises a duplexer array 651, a plurality of UCs 611, a plurality of DCs 612, a plurality of DACs 613, a plurality of ADCs 614, a digital channel deaggregation unit 615, a digital channel aggregation unit 616, a high-speed ADC 654, a high-speed DAC 653, and an optical frontend 655. The duplexer array 651 is communicatively coupled to a plurality of antennas 642, similar to the antennas 542. The duplexer array 651 is an RF device or an RF component configured to separate the sending and receiving RF signals to and from the antennas 642. The UCs 611, the DCs 612, the DAC 613, and the ADCs 614 are similar to the UC 411, the DC 412, the DAC 413, and the ADC 414, respectively. The UCs 611 and 411 may be components and devices, such as RF I/Q modulators, configured to frequency upconvert an input signal. The DCs 612 and 412 may be components and devices, such as RF I/Q modulators, configured to frequency downconvert an input signal. The optical frontend 655 comprises a plurality of PAs 617, a PD 618, a laser 619, and an optical circulator 652. The PAs 617, the PD 618, the laser 619, and the optical circulator 652 are similar to the PAs 417, the PD 418, the laser 419, and the optical circulator 452, respectively.

In a UL direction at the RRU 610, the DCs 612 are coupled to the duplexer array 651 and the ADCs 614 are coupled to the DCs 612. A DC 612 and ADC 614 pair operates on a UL channel signal received from an antenna 642, where the DC 612 downconverts the UL channel signal from an RF band into the BB to produce the BB signal. The ADC 614 comprises two converters configured to convert the I and Q component of the BB signal into a digital BB signal. The digital channel aggregation unit 616 is coupled to the ADCs 614 and configured to aggregate the digital BB signals into an aggregated UL signal. For example, the digital channel aggregation unit 616 in effect shifts each digital BB signal to the first frequency bands according to the pre-determined UL channel map and combines the frequency-shifted digital IF signals. The high-speed DAC 653 is coupled to the digital channel aggregation unit 616 and configured to convert the aggregated UL signal into an analog electrical signal. It should be noted that the high-speed DAC 653 operates at a high sampling rate, for example, in the order of giga-samples per second (GSa/s) depending on the number of aggregated channels and the BWs of the channels, as discussed more fully below. A first of the PAs 617 is coupled to the high-speed DAC 653 and configured to amplify the aggregated UL signal to suitable voltage levels for transmission. The laser 619 is coupled to the first PA 617 and configured to modulate the aggregated signal onto an optical signal generated by the laser 619, for example, by employing the IM scheme. The optical signal is referred to as a modulated signal, where one or more signal properties of an optical carrier signal are modified according to variations in the aggregated signal. For example, the IM scheme modifies the optical intensities or optical power of an optical carrier signal. The optical circulator 652 couples the laser 619 and the PD 618 to the link 630.

In a DL direction at the RRU 610, the PD 618 converts a received optical DL signal into an analog electrical signal, for example, by employing the DD scheme. A second of the PAs 617 is coupled to the PD 618 and configured to amplify the electrical signal into suitable voltage levels for receiver processing. The high-speed ADC 654 is coupled to the second PA 617 and configured to convert the analog electrical signal into digital signals. Similar to the high-speed DAC 653, the high-speed ADC 654 operates at a high sampling rate in the order of GSa/s. The digital channel deaggregation unit 615 is coupled to the high-speed ADC 654 and configured to perform channel deaggregation according to the pre-determined DL channel map to produce a plurality of the DL BB signals corresponding to the DL channels. The DACs 613 are coupled to the digital channel deaggregation unit 615 and configured to convert the I and Q components of each of the DL channel signals into analog electrical signals. The UCs 611 are coupled to the DACs 613 and configured to upconvert the analog electrical signals from the BB to the original RF band for transmission via the antennas 642.

The BBU 620 comprises an optical frontend 665, a high-speed DAC 663, a high-speed ADC 664, a digital channel aggregation unit 626, a digital channel deaggregation unit 625, and a BB DSP unit 621. The optical frontend 665, the high-speed DAC 663, the high-speed ADC 664, the digital channel aggregation unit 626, and the digital channel deaggregation unit 625 are similar to the optical frontend 655, the high-speed DAC 653, the high-speed ADC 654, the digital channel aggregation unit 616, and the digital channel deaggregation unit 615, respectively. As shown in the system 600, the UL path (shown as 681) of the BBU 620 and the DL path (shown as 672) of the RRU 610 are similar, while the DL path (shown as 682) of the BBU 620 and the UL path (shown as 671) of the RRU 610 are similar. However, the BBU 620 further comprises a BB DSP unit 621, similar to the BB DSP unit 421, coupled to the digital channel aggregation unit 626 and the digital channel deaggregation unit 625. The BB DSP unit 621 is configured to perform BB DSP functions for the UL channels and the DL channels. For example, in the DL direction, the BB DSP unit 621 generates BB signals for DL channels based on DL packets received from a core network, such as the core network 550, and the digital channel aggregation unit 626 aggregates the DL BB signals. In the UL direction, the digital channel deaggregation unit 625 deaggregates the UL channel signals into multiple UL BB signals and the BB DSP unit 621 converts the UL BB signals into UL packets for transmission to the core network. It should be noted that the digital channel aggregation unit 616 and the digital channel deaggregation unit 615 at the RRU 610, as well as the digital channel aggregation unit 626 and the digital channel deaggregation unit 625 at the BBU 620 are suitable for implementation in a DSP unit, which may be a lower performance DSP unit than the BB DSP unit 621.

Figure 7:
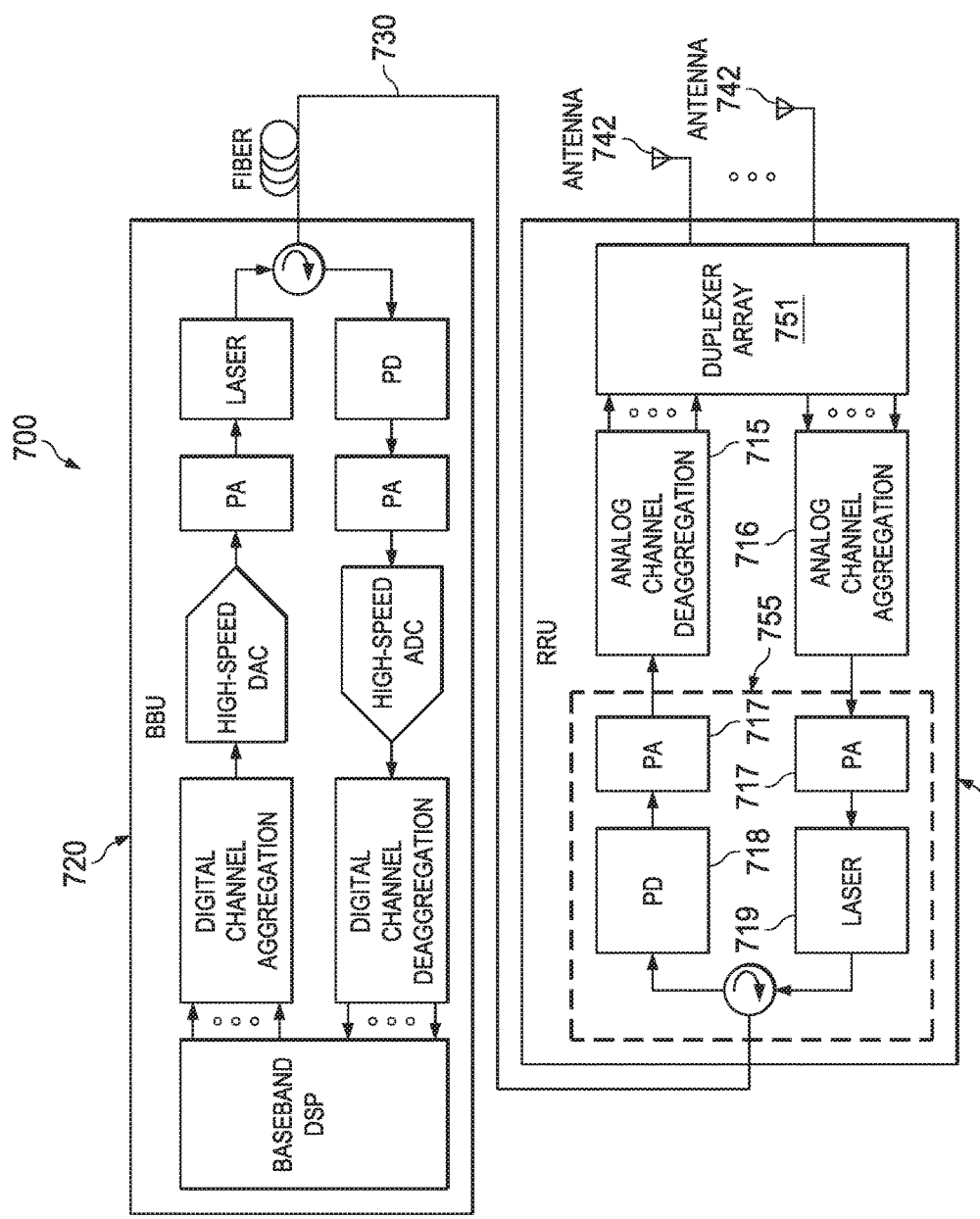
FIG. 7 is a schematic diagram of another embodiment of an aggregated wireless fronthaul communication system.

FIG. 7 is a schematic diagram of another embodiment of an aggregated wireless fronthaul communication system 700. The system 700 is similar to the system 500 and 600. The system 700 comprises an RRU 710 communicatively coupled to a BBU 720, similar to the BBU 521 and the BBU 620, through a link 730, similar to the link 530 and 630. However, the RRU 710 performs channel aggregation and channel deaggregation in an analog domain instead of in the digital domain as in the RRU 610 of system 600. The RRU 710 comprises a duplexer array 751, an analog channel aggregation unit 716, an analog channel deaggregation unit 715, and an optical frontend 755. The duplexer array 751 and the optical frontend 755 are similar to the duplexer array 651 and the optical frontend 655, respectively. The optical frontend 755 comprises a plurality of PAs 717, similar to the PAs 617, a laser 719, similar to the laser 619, and a PD 718, similar to the PD 618. Similar to the RRU 610, the RRU 710 is configured to interface to a plurality of antennas 742, similar to the antennas 642, to receive UL RF signals corresponding to multiple UL channels and transmit DL RF signals corresponding to multiple DL channels.

In a UL direction, the analog channel aggregation unit 716 is positioned between the duplexer array 751 and the optical frontend 755. The analog channel aggregation unit 716 is configured to aggregate the received UL RF signals from the multiple UL channels into an aggregated UL signal. For example, the analog channel aggregation unit 716 comprises an array of analog frequency mixers, such as single-sideband modulators (SSBMs), RF combiners, RF PAs, and RF filters. The analog channel aggregation unit 716 performs similar FDM as performed by the digital channel aggregation unit 616 and the DC 612, but in the analog domain. In a DL direction, the analog channel deaggregation unit 715 is positioned between the duplexer array 751 and the optical frontend 755. The analog channel deaggregation unit 715 comprises RF splitters, RF filters, and analog frequency mixers, such as SSBMs, configured to filter and shift the aggregated DL signal according to corresponding RF bands.

Wireless channels comprise well-defined channel BWs and channel sampling rates. An example of E-UTRA channel configurations are shown in Table 1 below.

TABLE 1

| E-UTRA Channel Configurations | | | | | |
|---|---|---|---|---|---|
| Channel BW (MHz) | 1.4 | 3 | 5 | 10 | 15 | 20 |
| FFT size | 128 | 256 | 512 | 1024 | 1536 | 2048 |
| Sampling rate (MHz) | 1.92 | 3.84 | 7.68 | 15.36 | 23.04 | 30.72 |

In addition to the channel configurations shown in Table 1, E-UTRA may support carrier aggregation (CA), for example, as described in the LTE-A standard specification, to increase the effective BW of a channel to be beyond 20 MHz. For example, an LTE-A channel may combine up to about five 20 MHz channels to provide a channel with a BW of about 100 MHz. The disclosed embodiments may aggregate RF channels with any BWs including the LTE-A channel with CA. However, the disclosed channel aggregation scheme may require the RF channels to comprise sampling rates with some common factors, as discussed more fully below.

Figure 8:
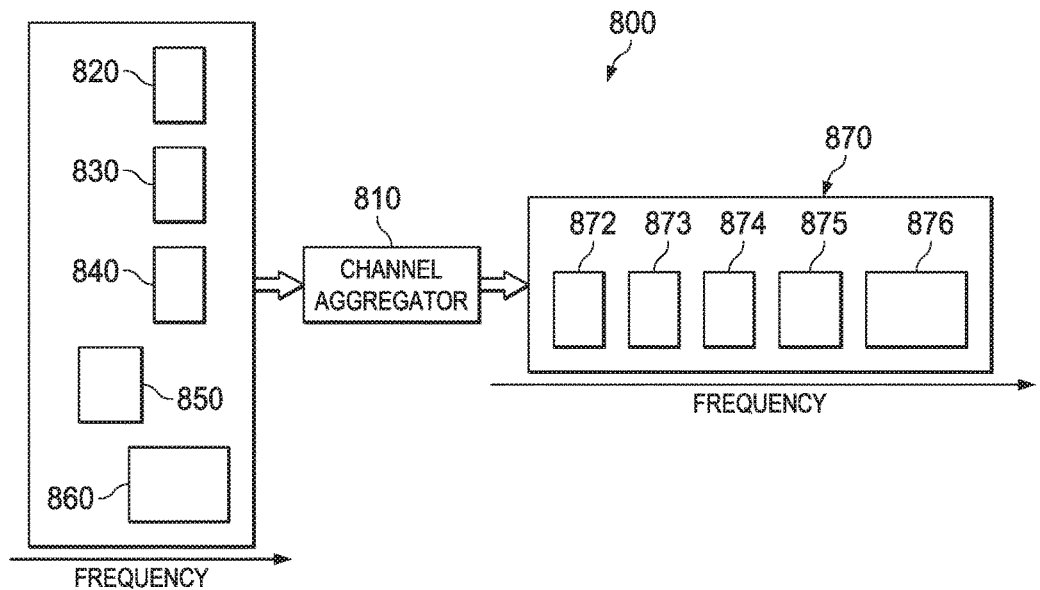
FIG. 8 is a schematic diagram of an embodiment of a channel aggregation scheme.

FIG. 8 is a schematic diagram of an embodiment of a channel aggregation scheme 800. The scheme 800 is employed by the systems 500, 600, and 700. In the scheme 800, a channel aggregator 810 is configured to aggregate a plurality of signals 820, 830, 840, 850, and 860 into an aggregated signal 870 by employing similar FDM mechanisms as the digital channel aggregation unit 616 and the analog channel aggregation unit 716. The signals 820-860 may be associated with different wireless channels and may be similar to the RF signals received and transmitted over the antennas 542, 642, and 742. For example, the signals 820-860 may be a combination of LTE signals, LTE-A signals, or other E-UTRA signals and may comprise a channel configuration similar to the channel configurations shown in Table 1. As shown, the signals 820-860 occupy various frequency bands and span various bandwidths. The channel aggregator 810 shifts the signals 820-860 to different non-overlapping frequency bands and combines the frequency-shifted signals into the aggregated signal 870. The signals 872, 873, 874, 875, and 876 carried in the aggregated signal 870 correspond to the signals 820, 830, 840, 850, and 860 after frequency shifting, respectively. The aggregated signal 870 comprises a total BW that is about the same as the combined BWs of the signals 820-860. The aggregated signal 870 is similar to the aggregated UL signal and the aggregated DL signal carried in the optical signals transported over the links 530, 630, and 730.

Figure 9:
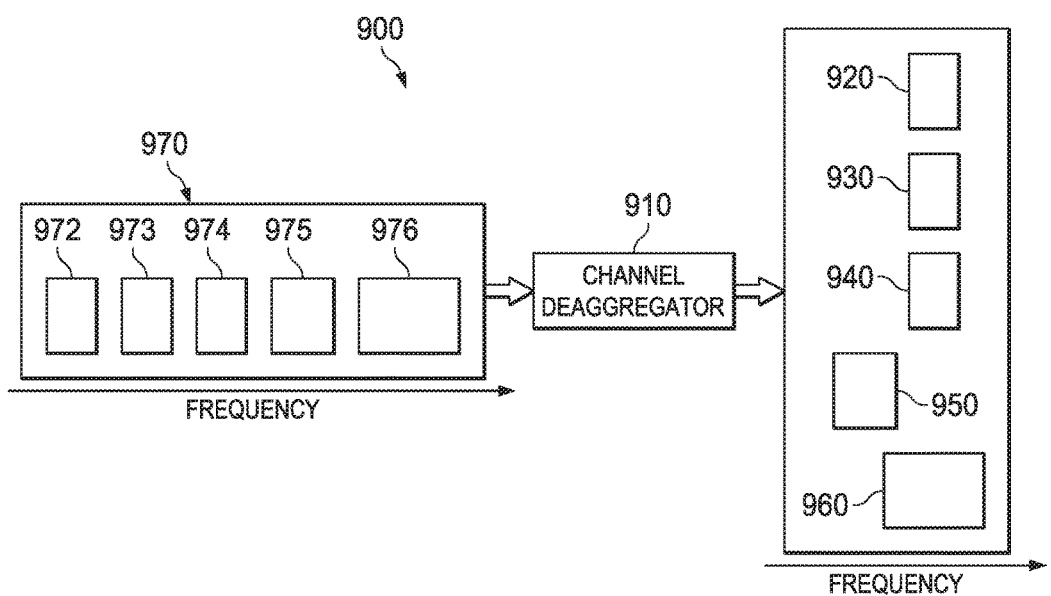
FIG. 9 is a schematic diagram of an embodiment of a channel deaggregation scheme.

FIG. 9 is a schematic diagram of an embodiment of a channel deaggregation scheme 900. The scheme 900 is employed by the systems 500, 600, and 700. In the scheme 900, a channel deaggregator 910 is configured to deaggregate a signal 970 by performing similar frequency demultiplexing and shifting mechanisms as in the digital channel deaggregation unit 615 and the analog channel deaggregation unit 715. The signal 970 is similar to the aggregated UL signal and the aggregated DL signal carried in an optical signal transported over the links 530, 630, and 730. As shown, the signal 970 carries a plurality of signals 972, 973, 974, 975, and 976, where each of the signals 972-976 may span a similar BW or a different BW. The channel deaggregator 910 separates the signals into a plurality of signals 920, 930, 940, 950, and 960 and frequency-shifts the signals 920-960 to some pre-determined frequency bands. The signals 920-960 are similar to the RF signals received and transmitted over the antennas 542 and antennas 642, and 742 and may comprise a channel configuration similar to the channel configurations shown in Table 1. It should be noted that the channel deaggregator 910 may be pre-configured with a channel map that maps the signals 972-976 to the frequency bands of the signals 920-960.

Figure 10:
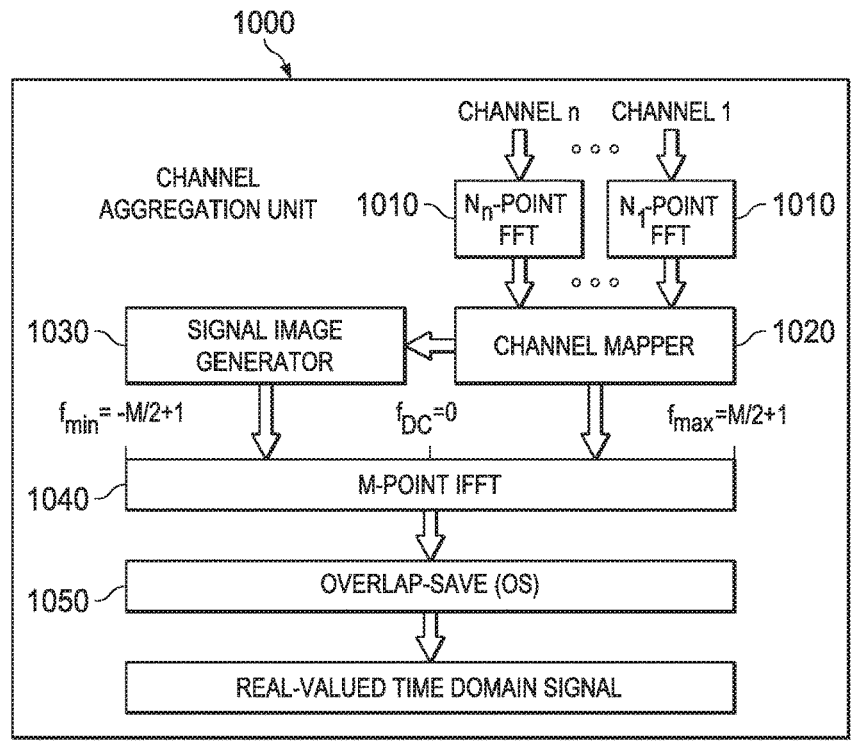
FIG. 10 is a schematic diagram of an embodiment of a channel aggregation unit that employs a frequency domain implementation scheme.

FIG. 10 is a schematic diagram of an embodiment of a channel aggregation unit 1000 that employs a frequency domain implementation scheme. The channel aggregation unit 1000 is employed by an RRU, such as the RRU 510 and 610, and/or a BBU, such as the BBU 521, 620, and 720. The channel aggregation unit 1000 is similar to the digital channel aggregation units 616 and 626. When employing the channel aggregation unit 1000 at the RRU, the channel aggregation unit 1000 may be implemented by a low-performance and/or low-cost DSP unit. When employing the channel aggregation unit 1000 at the BBU, the channel aggregation unit 1000 may be implemented by the same BB DSP unit, such as the BB DSP unit 621 that implements the BB DSP functions.

The channel aggregation unit 1000 comprises a plurality of FFT units 1010, a channel mapper 1020, a signal image generator 1030, an IFFT unit 1040, and an OS unit 1050. The FFT units 1010 are configured to transform signals from a time domain into a frequency domain. Each FFT unit 1010 operates on a signal corresponding to a particular wireless RF channel (shown as channel 1, . . . , channel n), which may comprise a channel configuration similar to the channel configurations as shown in Table 1. Each FFT unit 1010 is configured to perform an N-point FFT, where N is a positive integer corresponding to the FFT size. The FFT size may be different for a different FFT unit 1010 depending on the BW of the signal processed by the FFT unit 1010, as discussed more fully below.

The channel mapper 1020 is coupled to the FFT units 1010 and configured to map the frequency signals produced by the FFT units 1010 to adjacent non-overlapping frequency bands or FFT bins to produce an aggregated frequency signal, denoted as E(f), spanning a positive frequency band between $f_{DC}$ and $f_{MAX}$, where $f_{DC}$ corresponds to the frequency bin number 0 at direct current frequency 0 Hz and $f_{MAX}$ corresponds to the frequency bin number $$\frac{M}{2} + 1.$$

It should be noted that $f_{DC}$ also corresponds to the optical carrier frequency when the signal produced by the channel aggregation unit 1000 is converted to an optical signal, for example, by employing an optical frontend similar to the optical frontend 665. The frequency of $f_{MAX}$ depends on the sampling rate of the FFT, as discussed more fully below.

The signal image generator 1030 is coupled to the channel mapper 1020 and configured to generate an image signal that is a complex conjugate of the signal E(f), denoted as E*(f). As such, the image signal E*(f) is a spectral mirror image of the signal E(f) folded at direct current. For example, the signal E*(f) spans a negative frequency band between $f_{DC}$ and $f_{MIN}$, where $f_{MIN}$ corresponds to the frequency bin $$\frac{-M}{2} + 1.$$

Thus, E*(f)=E(−f).

The IFFT unit 1040 is coupled to the channel mapper 1020 and the signal image generator 1030 and configured to perform an M-point IFFT, where the value M is a positive integer substantially larger than the value N and corresponds to the IFFT size of the IFFT unit 1040. The IFFT unit 1040 operates at an aggregated sampling rate (ASR), where the ASR and the value M are determined based on the sampling rates, the channel BWs of the input signals at the FFT units 1010, and the number of signals for aggregation, as discussed more fully below. It should be noted that the signal image generator 1030 is employed such that the IFFT unit 1040 produces a real-valued signal according to the FFT symmetry property, where the real-valued signal is suitable for optical IM.

The OS unit 1050 is coupled to the IFFT unit 1040 and configured to perform OS with an overlapping length, denoted as L. The overlapping length L may be configured as follows:

$$L \geq 2 \times \left(\frac{M}{n}\right), \quad (1)$$

where n is the smallest FFT size of the FFT units 1010.

The OS unit 1050 extracts the center M-L samples for every M samples generated by the IFFT unit 1040. Thus, the number of samples advances in each FFT/IFFT cycle for a channel i is computed as follows:

$$\frac{(M-L) \times N_i}{M}, \quad (2)$$

where $N_i$ represents the FFT size employed by the $i^{th}$ FFT unit 1010 for the channel i.

The touchless aggregation is achieved by maintaining the same channel BW for each channel i during channel aggregation and channel deaggregation. For example, the FFT sizes, $N_i$, for the FFT units 1010 and the IFFT size, M, for the IFFT unit 1040 are selected based on the sampling rates, the number of channels, and the BWs of the channels such that each wireless channel i corresponds to an integer number of IFFT points. It should be noted the FFT units 1010 employ a substantially smaller FFT size than the FFT sizes defined in the E-UTRA channel configurations shown in Table 1 to reduce DSP complexity, yet provide sufficient system performance.

In a wireless fronthaul system, a spectral resolution for the IFFT unit 1040 is computed as follows:

$$df = \frac{SR_{min}}{n}, \quad (3)$$

where df is the spectral resolution, $SR_{min}$ is the minimum sampling rate (SR) of the wireless or mobile signals in the system, and n is the FFT size employed by the FFT unit 1010 to process the minimum SR channel signal. The ASR for the IFFT is configured to be about 3 times the total channel BWs of the wireless fronthaul system to provide sufficient spectral resolutions, where a factor 2 is taken into account for the image generation at the signal image generator 1030 and a factor of about 1.5 for a moderate oversampling ratio.

For example, to support about eight 5-CA 20 MHz channel signals in a wireless fronthaul system, the IFFT unit 1040 operates at an ASR computed as shown below:

$$ASR = 3 \times 8 \text{ channels} \times 5 \text{ CA} \times 30.72 \text{ MHz} = 3.7 \text{ GSa/s}, \quad (4)$$

where the 20 MHz channels are sampled at an SR of 30.72 MHz as shown in Table 1 described above. It should be noted that the aggregated sampling rate (ASR) of the IFFT is preferably selected such that the sampling rate of each wireless channel signal corresponds to an integer number of IFFT points in a frequency domain. In this case, the bandwidths of the frequency bands allocated to the wireless channel signals in the aggregated signal correspond to respective sampling rates of the wireless channel signals.

The IFFT size is computed as shown below:

$$IFFT \text{ size} = \frac{ASR}{df}. \quad (5)$$

By substituting equations (3) and (4) into equation (5) and assuming $SR_{min}$ to be about 1.92 MHz and n to be about 4, a 8192-point IFFT is sufficient to support the wireless fronthaul system. It should be noted that the values M, L, n, df, and ASR for each wireless fronthaul system are configured according to the number of channels, and the total channel BWs, etc.

As an example, channel 1 may be a 1.4 MHz-BW channel sampled at about 1.92 MHz, and may be first converted to the frequency-domain by a 4-point FFT, before being multiplexed with other channels by a 8192-point IFFT, resulting in an ASR of about 3.93216 gigahertz (GHz) (=1.92 MHz× 8192/4). When L is selected to be M/2, channel 1 advances by 2 samples after each FFT/IFFT cycle according to equation (2). To maintain a fixed IFFT size and a fixed ASR in the channel aggregation unit 1000, a channel 2 with a 20 MHz BW channel sampled at about 30.72 MHz is converted to the frequency domain by a 64-point FFT before being multiplexed with other channels by the same 8192-point IFFT. As such, channel 2 advances by 32 samples after each FFT/IFFT cycle according to equation (2). In some embodiments, a discrete Fourier transform (DFT) and/or a discrete inverse Fourier transform (IDFT) may be employed instead of the FFT and/or IFFT, respectively.

Figure 11:
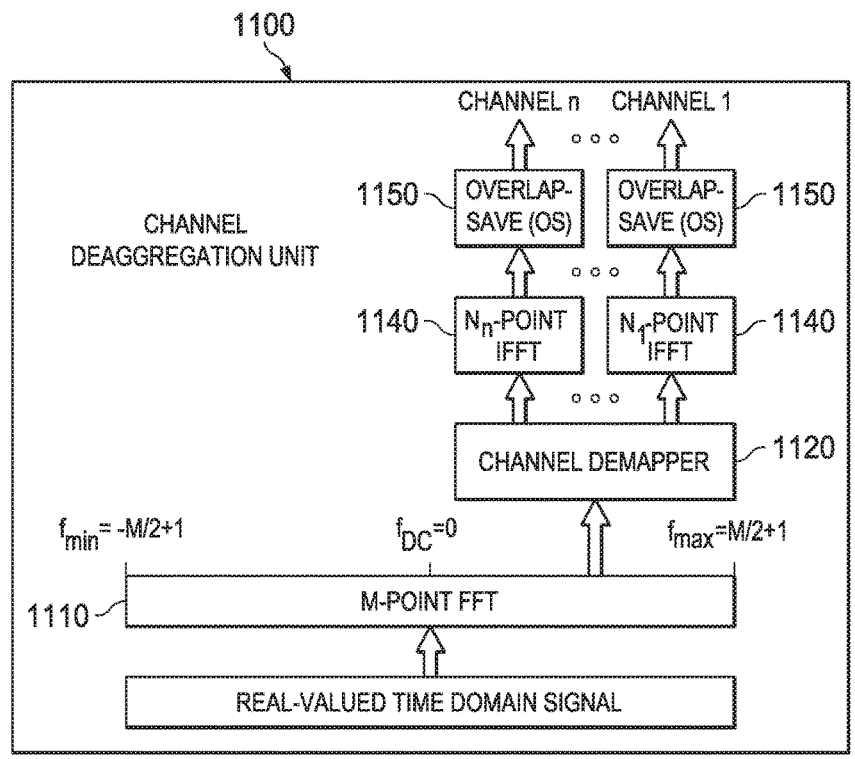
FIG. 11 is a schematic diagram of an embodiment of a channel deaggregation unit that employs a frequency domain implementation scheme.

FIG. 11 is a schematic diagram of an embodiment of a channel deaggregation unit 1100 that employs a frequency domain implementation scheme. The channel deaggregation unit 1100 is employed by an RRU, such as the RRU 510 and 610, and/or a BBU, such as the BBU 521, 620, and 720. The channel deaggregation unit 1100 is similar to the digital channel deaggregation units 615 and 625. The channel deaggregation unit 1100 performs digital channel deaggregation in a frequency domain. When employing the channel aggregation unit 1000 at the RRU, the channel aggregation unit 1000 may be implemented by a lower-performance and/or low-cost DSP unit. When employing the channel aggregation unit 1000 at the BBU, the channel aggregation unit 1000 may be implemented by the same BB DSP unit, such as the BB DSP unit 621 that implements the BB DSP functions.

The channel deaggregation unit 1100 comprises an FFT unit 1110, a channel demapper 1120, a plurality of IFFT units 1140, and a plurality of OS units 1150, similar to the OS unit 1050. The FFT unit 1110 is similar to the FFT unit 1010 and may be configured to perform an M-point FFT to convert an aggregated signal from a time domain to a frequency domain to produce a frequency signal, where the aggregated signal is a real-valued signal. The FFT unit 1110 operates at an ASR, which may be similar to the ASR at the IFFT unit 1040 in the channel aggregation unit 1000. The channel demapper 1120 is coupled to the FFT unit 1110 and configured to demultiplex the frequency signal at the positive frequency band, between $f_{DC}$ and $f_{MAX}$, into a plurality of frequency signals, each corresponding to a particular wireless channel (shown as channel 1, . . . , channel n) according to a pre-determined channel map. The portion of the frequency signal located at the negative frequency band, between $f_{DC}$ and $f_{MIN}$, may be discarded.

Each IFFT unit 1140 is similar to the IFFT unit 1040 and is configured to perform an N-point IFFT. The IFFT size N may vary for different channels depending on the ASR at the FFT unit 1110, the sampling rate and the channel BWs of the channels, and the number of channels.

In a wireless fronthaul system, such as the systems 500, 600, and 700, the key parameters, such as value M, the value $N_i$, the ASR, the value L, the value n, and the channel map, employed for channel aggregation and channel deaggregation may be software defined. The key parameters are configured based on the wireless communication protocols in use and the number of channels supported in the system. In addition, the channel aggregation unit and the channel deaggregation unit for a particular transmission direction employ the same value M, the same value $N_i$, the same ASR, the same value L, and the same channel map. For example, in a UL direction, the channel aggregation unit, such as the channel aggregation unit 1000, at an RRU, such as the RRU 510 and 610, and the channel deaggregation unit, such as the channel deaggregation unit 1100, at a BBU, such as the BBU 521, 620, and 720 are configured with the same key parameter values. Similarly, in a DL direction, the channel aggregation unit at the BBU and the channel deaggregation unit at the RRU are configured with the same key parameter values.

Figure 12:
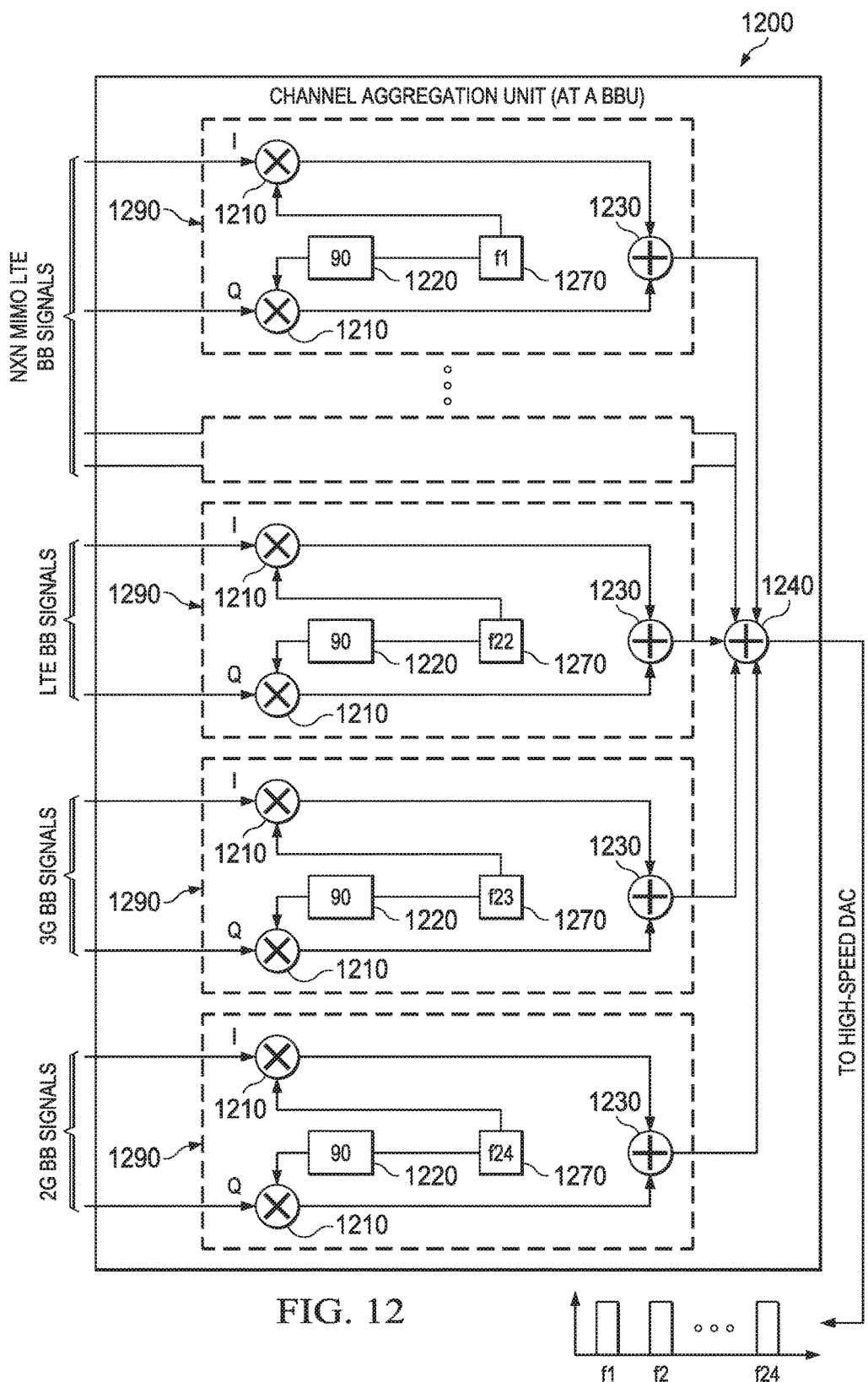
FIG. 12 is a schematic diagram of an embodiment of a channel aggregation unit that employs a time domain implementation scheme.

FIG. 12 is a schematic diagram of an embodiment of a channel aggregation unit 1200 that employs a time domain implementation scheme. The channel aggregation unit 1200 is employed by a BBU, such as the BBU 521, 620, and 720. The channel aggregation unit 1200 performs similar frequency shifting and multiplexing as in the channel aggregation unit 1000, but the operations are carried out in a time domain instead of the frequency domain. The channel aggregation unit 1200 may be implemented by the same BB DSP unit, such as the BB DSP unit 621, that performs the BB DSP at the BBU. The channel aggregation unit 1200 comprises an array of quadrature mixers 1290 coupled to a signal adder 1240. The quadrature mixer 1290 is configured to frequency shift a pair of digital BB I and Q signals. Each quadrature mixer 1290 comprises two signal multipliers 1210, a phase shifter 1220, a frequency generator 1270, and a signal adder 1230. The frequency generator 1270 is configured to generate a signal at a particular frequency. The phase shifter 1220 is configured to provide an about 90 degree (°) phase shift. A first of the signal multipliers 1210 is coupled to the frequency generator 1270 to frequency shift the digital BB I signal to the frequency of the frequency generator 1270. A second of the signal multipliers 1210 is coupled to the frequency generator 1270 and the phase shifter 1220 to frequency shift the digital BB Q signal to the frequency of the frequency generator 1270. The signal adder 1230 is coupled to the signal multipliers 1210 and configured to add the frequency-shifted I and Q signals. The signal adder 1240 is coupled to the signal adders 1230 and configured to combine the outputs of the quadrature mixers 1290 to produce an aggregated DL signal.

For example, the channel aggregation unit 1200 receives a plurality of digital BB I/Q signals that correspond to a plurality of wireless RF DL channels, such as an LTE MIMO output channel, an LTE channel, a third generation (3G) wireless channel, a second generation (2G) wireless channel. In the channel aggregation unit 1200, each pair of digital BB I and Q signals are frequency-shifted to a different frequency, denoted as $f_i$ (shown as $f_1, \ldots, f_{22}, f_{23}$, and $f_{24}$), by the quadrature mixer 1290 according to a pre-determined DL channel map. It should be noted that an N×N MIMO channel comprises N output channels. The output signal of the signal adder 1240 comprises an aggregated DL signal carrying the digital BB I/Q signals in different frequency bands, where the aggregated DL signal is sent to a high-speed DAC, such as the high-speed DAC 663 and 653.

Figure 13:
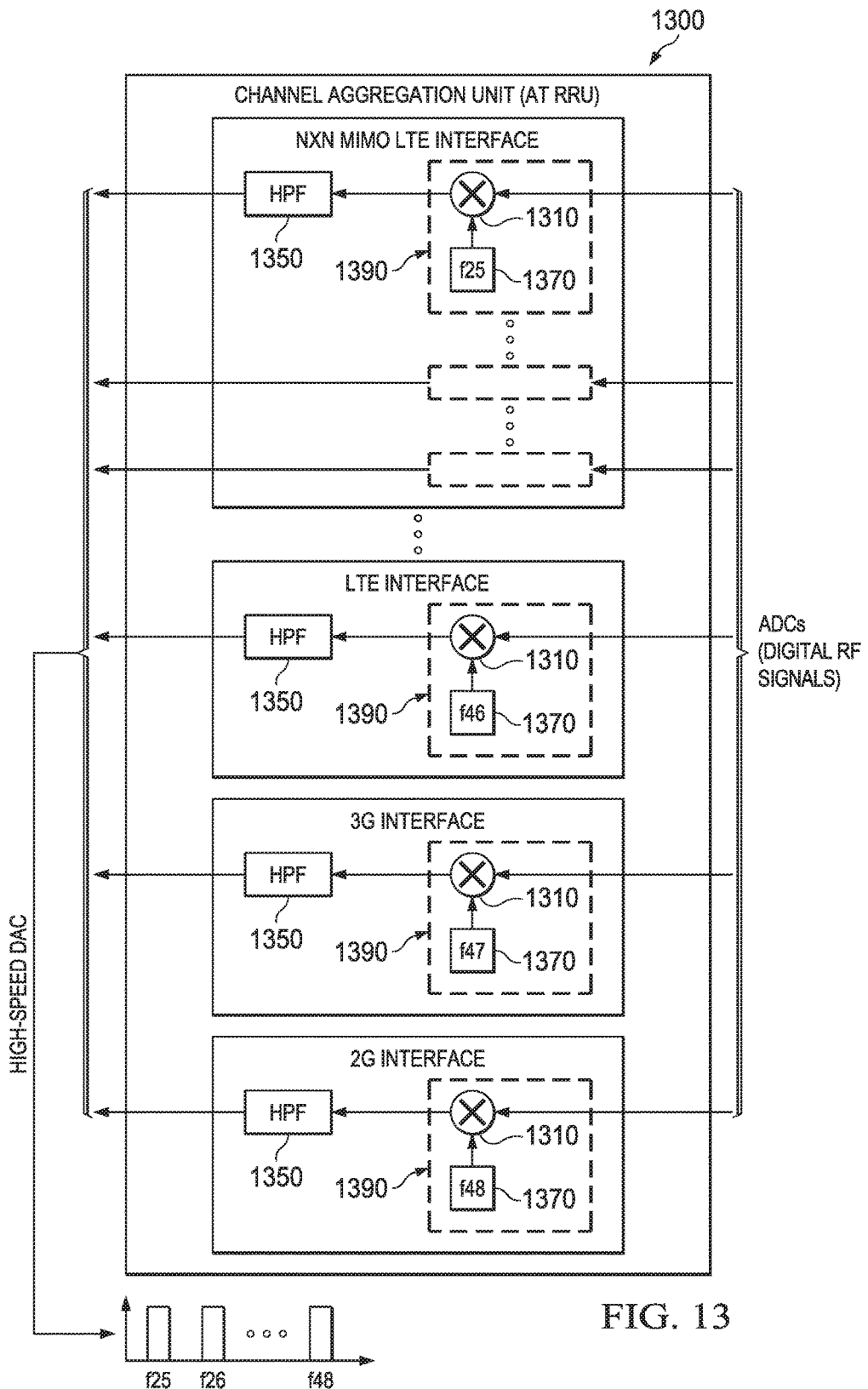
FIG. 13 is a schematic diagram of another embodiment of a channel aggregation unit that employs a time domain implementation scheme.

FIG. 13 is a schematic diagram of another embodiment of a channel aggregation unit 1300 that employs a time domain implementation scheme. The channel aggregation unit 1300 is employed by an RRU, similar to the RRU 510 and 610. The channel aggregation unit 1300 performs similar frequency shifting and multiplexing as in the channel aggregation unit 1000, but the operations are carried out in a time domain instead of the frequency domain. The channel aggregation unit 1300 may be implemented by a DSP unit, which may be a low-performance and/or low-cost DSP. The channel aggregation unit 1300 comprises an array of mixers 1390, each comprising a signal multiplier 1310, similar to the signal multiplier 1210, a frequency generator 1370, similar to the frequency generator 1270, and a high pass filter (HPF) 1350. In the mixer 1390, the signal multiplier 1310 is coupled to the frequency generator 1370 to frequency shift an input signal to the frequency of the frequency generator 1370. The HPF 1350 is configured to filter out the high-frequency components, for example, out-of-band noise, in the frequency-shifted signal.

For example, the channel aggregation unit 1300 receives a plurality of digital RF signals from a plurality of ADCs, such as the ADCs 614. Each received digital RF signal corresponds to a particular wireless RF UL channel. In the channel aggregation unit 1300, each digital RF signal is frequency-shifted to a different frequency, denoted as $f_i$ (shown as $f_{25}, \ldots, f_{46}, f_{47}$, and $f_{48}$), by the mixer 1390 according to a pre-determined UL channel map. Each frequency-shifted signal is filtered by an HPF 1350, where the cut-off frequency of the HPF 1350 is configured according to the frequency band of the corresponding RF signal. It should be noted that an N×N MIMO channel comprises N input channels. The output of the mixers 1390 may be combined to produce an aggregated UL signal carrying the UL RF signals in different frequency bands, where the aggregated UL signal may be sent to a high-speed DAC such as the high-speed DAC 663 and 653.

Figure 14:
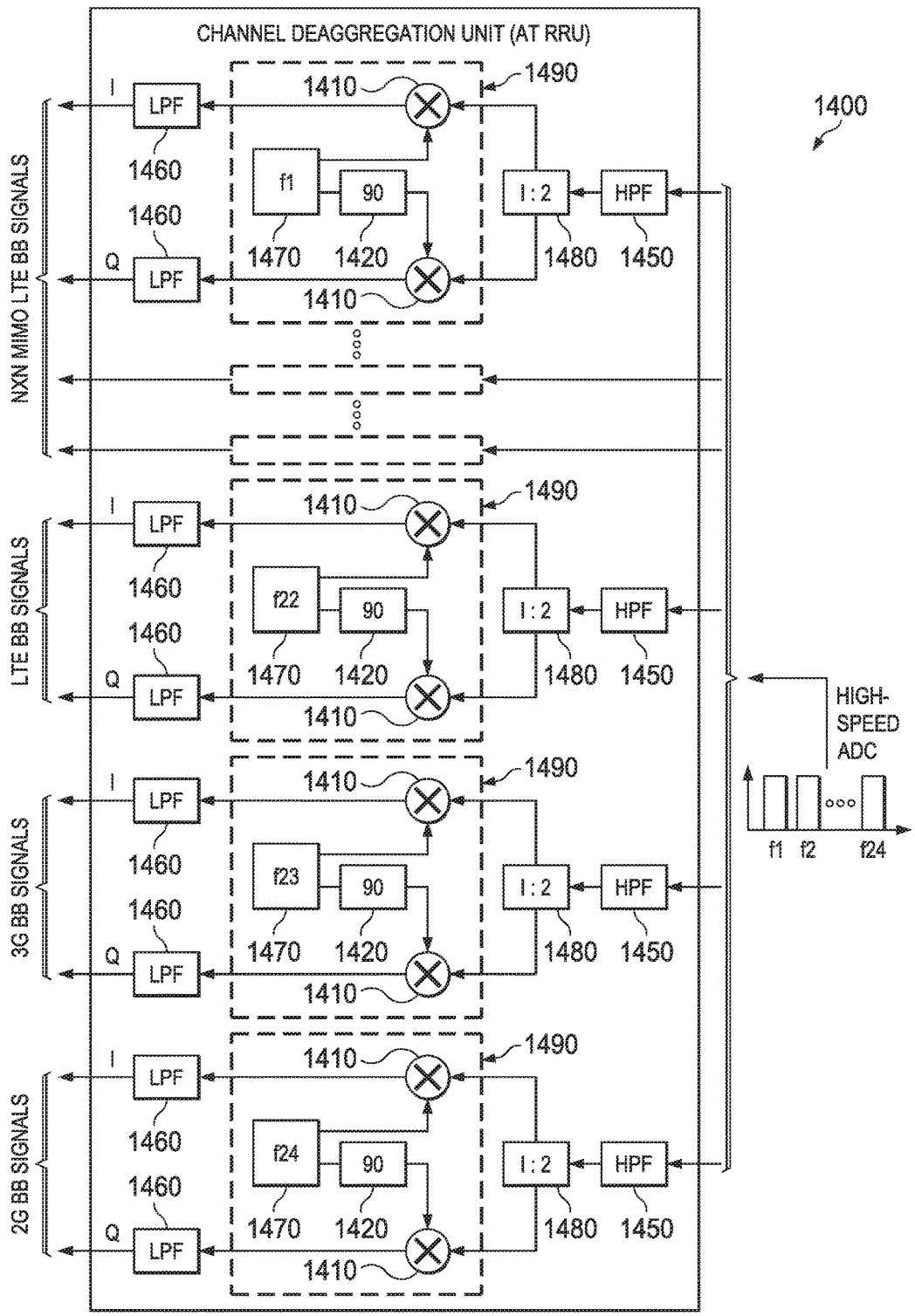
FIG. 14 is a schematic diagram of an embodiment of a channel deaggregation that employs a time domain implementation scheme.

FIG. 14 is a schematic diagram of an embodiment of a channel deaggregation unit 1400 that employs a time domain implementation scheme. The channel deaggregation unit 1400 is employed by a BBU, such as the BBU 521, 620, and 720. The channel aggregation unit 1400 performs similar frequency shifting and demultiplexing as in the channel deaggregation unit 1100, but the operations are carried out in a time domain instead of the frequency domain as in the channel deaggregation unit 1100. The channel deaggregation unit 1400 may be implemented by the same BB DSP unit, such as the BB DSP unit 621, that performs the BB DSP at the BBU. The channel deaggregation unit 1400 comprises an array of quadrature mixers 1490, signal splitter 1480, LPFs 1460, and HPFs 1450, similar to the HPFs 1350. The signal splitters 1480 are coupled to the HPFs 1450 and configured to split each input signal into two signals. Each quadrature mixer 1490 comprises two signal multipliers 1410, a phase shifter 1420, and a frequency generator 1470. The signal multipliers 1410, the phase shifter 1420, and the frequency generator 1470 are similar to the signal multipliers 1210, the phase shifter 1220, and the frequency generator 1270, respectively. A first of the signal multipliers 1410 is coupled to the frequency generator 1470 to produce an I signal. A second of the signal multipliers 1410 is coupled to the frequency generator 1470 and the phase shifter 1420 to produce a Q signal. The LPFs 1460 are coupled to the quadrature mixer 1490 and configured to filter out the low frequency components, for example, signals from an adjacent frequency band, to obtain the I and Q signals in a corresponding frequency band.

For example, the channel deaggregation unit 1400 receives an aggregated digital UL signal from a high-speed ADC, such as the high-speed ADC 664 and 654. The aggregated digital UL signal carries a plurality of UL signals in different frequency bands corresponding to a pre-determined UL channel map, where the center frequencies for the frequency bands are denoted as $f_i$ (shown as $f_1, \ldots, f_{22}, f_{23}$, and $f_{24}$) and the UL signals are associated with different wireless RF UL channels. The aggregated signal is first filtered by the HPF 1450 before frequency shifting and then filtered by the LPFs 1460 after the frequency shifting to produce a UL signal in the BB. The deaggregated BB signals may be processed according to the wireless communication protocol in use. It should be noted that an N×N MIMO channel corresponds to N input channels or BB signals.

Figure 15:
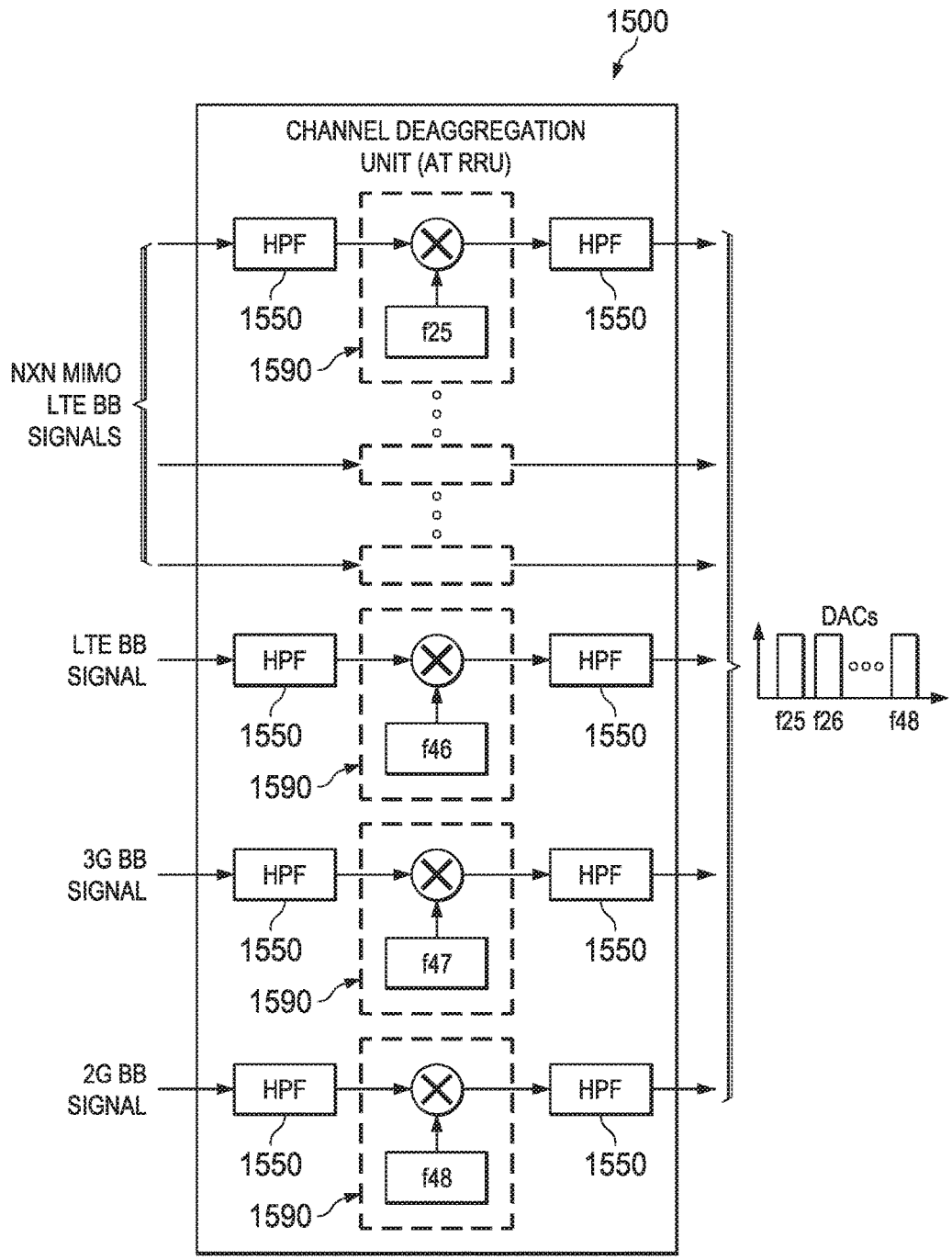
FIG. 15 is a schematic diagram of another embodiment of a channel deaggregation unit that employs a time domain implementation scheme.

FIG. 15 is a schematic diagram of another embodiment of a channel deaggregation unit 1500 that employs a time domain implementation scheme. The channel deaggregation unit 1500 is employed by an RRU, similar to the RRU 510 and 610. The channel aggregation unit 1500 performs similar frequency shifting and demultiplexing as in the channel deaggregation unit 1100, but the operations are carried out in a time domain instead of the frequency domain as in the channel deaggregation unit 1100. The channel deaggregation unit 1500 may be implemented by a DSP unit, which may be a low-cost and/or low-performance DSP unit. The channel deaggregation unit 1500 comprises an array of mixers 1590, similar to the mixers 1390, and HPFs 1550, similar to the HPFs 1350. Each mixer 1390 is positioned between a pair of HPFs 1550. For example, a first of the HPFs 1550 may remove the high-frequency components in an IF and then a second of the HPFs 1550 may remove the high-frequency components in an RF band.

For example, the channel deaggregation unit 1500 receives an aggregated digital DL signal from a high-speed ADC, such as the high-speed ADC 664 and 654. The aggregated digital DL signal carries a plurality of DL signals in different frequency bands according to a pre-determined DL channel map, where the center frequencies for the frequency bands are denoted as $f_i$ (shown as $f_{25}, \ldots, f_{46}, f_{47}$, and $f_{48}$) and the DL signals are associated with different wireless RF DL channels. The aggregated signal is first filtered by a HPF 1550, for example, in an IF band, prior to frequency shifting and filtered by another HPF 1550, for example, in a RF band, after the frequency shifting to produce a corresponding RF DL signal. It should be noted that an N×N MIMO channel comprises N output channels. The deaggregated RF signals may be sent to a plurality of DACs, similar to the DACs 613.

Figure 16:
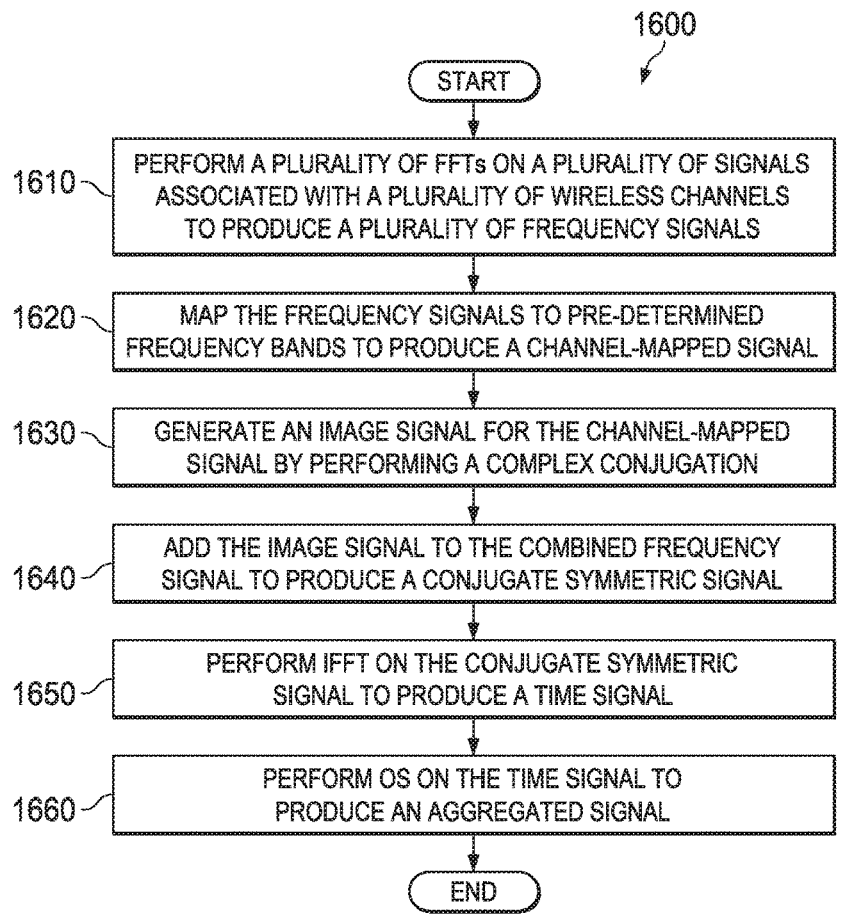
FIG. 16 is a flowchart of an embodiment of a method for channel aggregation.

FIG. 16 is a flowchart of an embodiment of a method 1600 for channel aggregation. The method 1600 is implemented by an RRU, such as the RRU 510 and 610, and/or a BBU, such as the BBU 521, 620, and 720. At step 1610, a plurality of FFTs is performed on a plurality of signals associated with a plurality of wireless channels to produce a plurality of frequency signals. For example, at an RRU, the signals are UL RF signals received from antennas, such as the antennas 542, 642, and 742 and may be frequency down-converted to an IF band to simplify implementation. At a BBU, the signals are DL BB signals destined for the wireless channels. It should be the noted that the sizes for the different FFTs may vary depending on the wireless channels' BWs as described above.

At step 1620, the frequency signals are mapped to pre-determined frequency bands to produce a channel-mapped signal. At step 1630, an image signal is generated for the channel-mapped signal by performing a complex conjugation. For example, the image signal is a spectral mirror image of the channel-mapped signal folded at the direct current. At step 1640, the image signal is combined with the channel-mapped signal to produce a conjugate symmetric signal.

At step 1650, an IFFT is performed on the conjugate symmetric signal to produce a time signal. For example, the IFFT size is larger than each of the FFT sizes and operates at a high ASR, where the IFFT size, the FFT sizes, and the ASR are selected such that the sampling rate of each wireless channel signal corresponds to an integer number of IFFT points. At step 1660, an OS is performed on the time signal to produce an aggregated signal. The wireless channel signals are carried in adjacent non-overlapping frequency bands with unchanged wireless channel BWs in the aggregated signal. In an embodiment, the OS may be performed by extracting samples at about the center of the time signal, instead of at the beginning of the time signal. For example, when the IFFT size is M and the overlap length of the OS is L, the number of samples to be extracted may be about M-L. It should be noted that the generation of the conjugate symmetric signal in steps 1630 and 1640 allows the time signal to be a real-valued signal such that an optical modulation scheme such as an IM scheme may be employed for optical transmission. The steps 1630 and 1640 may be optional for other optical modulation schemes.

Figure 17:
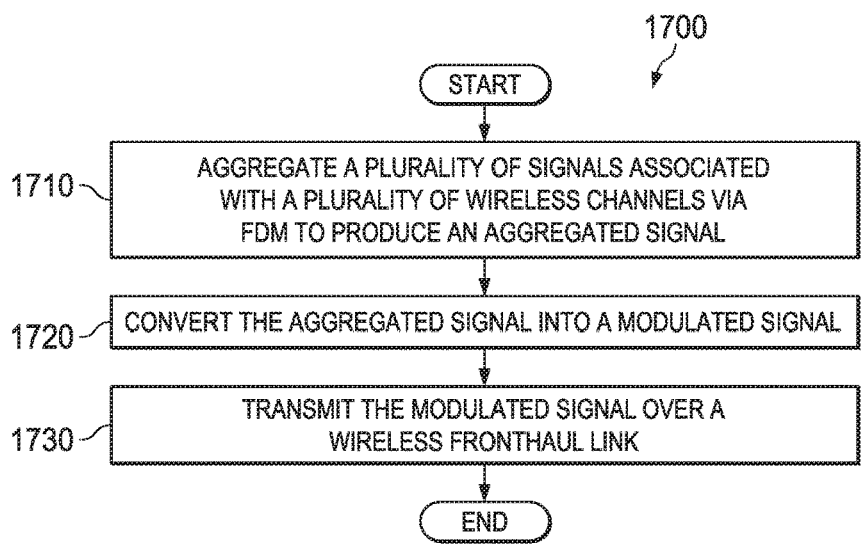
FIG. 17 is a flowchart of another embodiment of a method for channel aggregation.

FIG. 17 is a flowchart of another embodiment of a method 1700 for channel aggregation. The method 1700 is implemented by an RRU, such as the RRU 510 and 610, and/or a BBU, such as the BBU 521, 620, and 720. The method 1700 is substantially similar to the method 1600. At step 1710, a plurality of signals associated with a plurality of wireless channels is aggregated to produce an aggregated signal via FDM. The aggregated signal carries the signals in adjacent non-overlapping frequency bands, where each frequency band spans a same BW as a corresponding wireless channel. For example, the channel aggregation is performed in a digital domain by employing similar FFT and IFFT based mechanisms as described in the method 1600. Alternatively, the channel aggregation is performed in an analog domain by employing similar mechanisms as in the analog channel aggregation unit 716 described above. At step 1720, the aggregated signal is converted into a modulated signal. At step 1730, the modulated signal is transmitted over a wireless fronthaul link. For example, when the wireless fronthaul link is a wireless fronthaul optical link, such as the link 530, 630, and 730, the modulated signal is an optical signal generated by modulating the aggregated signal onto an optical carrier. Alternatively, the wireless fronthaul link may be a cable link or a free-space microwave link, in which different types of signal conversions, modulations, and transmissions may be performed at steps 1720 and 1730.

Figure 18:
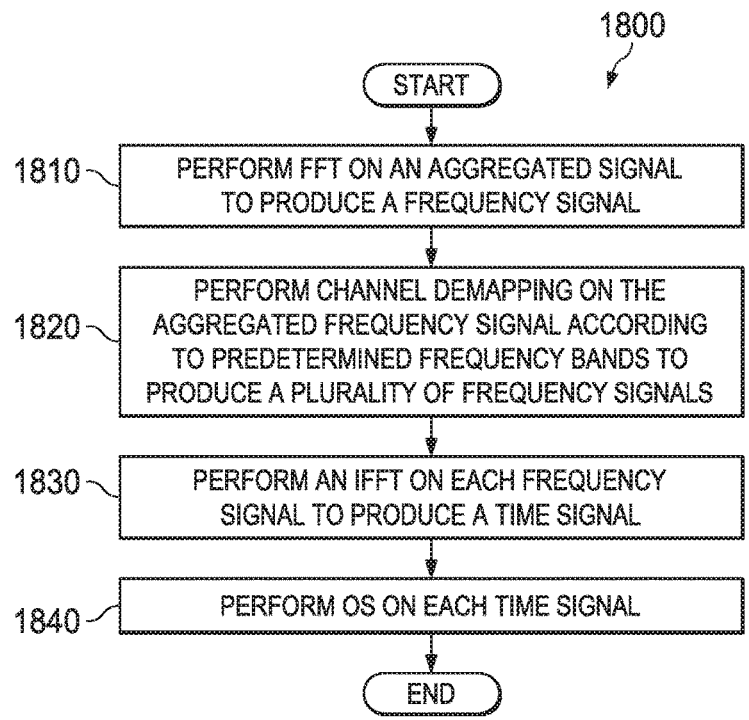
FIG. 18 is a flowchart of an embodiment of a method for channel deaggregation.

FIG. 18 is a flowchart of an embodiment of a method 1800 for channel deaggregation. The method 1800 is implemented by an RRU, such as the RRU 510 and 610, and/or a BBU, such as the BBU 521, 620, and 720. At step 1810, an FFT is performed on an aggregated signal to produce a frequency signal. The aggregated signal carries a plurality of wireless channel signals positioned in adjacent non-overlapping frequency bands according to a pre-determined channel map. For example, at an RRU, the aggregated signal is received from the BBU over an optical link, such as the link 530, 630, and 730, and the wireless channel signals are DL signals. At the BBU, the aggregated signal is received from the RRU over the optical link and the wireless channel signals are UL channels.

At step 1820, channel demapping is performed on the frequency signal according to the pre-determined channel map to produce a plurality of frequency signals. For example, the pre-determined channel map is employed by a channel aggregation unit, such as the digital channel aggregation unit 616 and 626, that generated the aggregated signal.

At step 1830, an IFFT is performed on each frequency signal to produce a time signal. It should be noted that different IFFT sizes may be used for the different frequency signals depending on the wireless channel BWs. At step 1840, an OS is performed on each time signal to reproduce the wireless channel signal, for example, by extracting samples positioned at about the center of the time signal. For example, when the IFFT size is M and the overlap length of the OS is L, the number of samples to be extracted may be about M-L.

Figure 19:
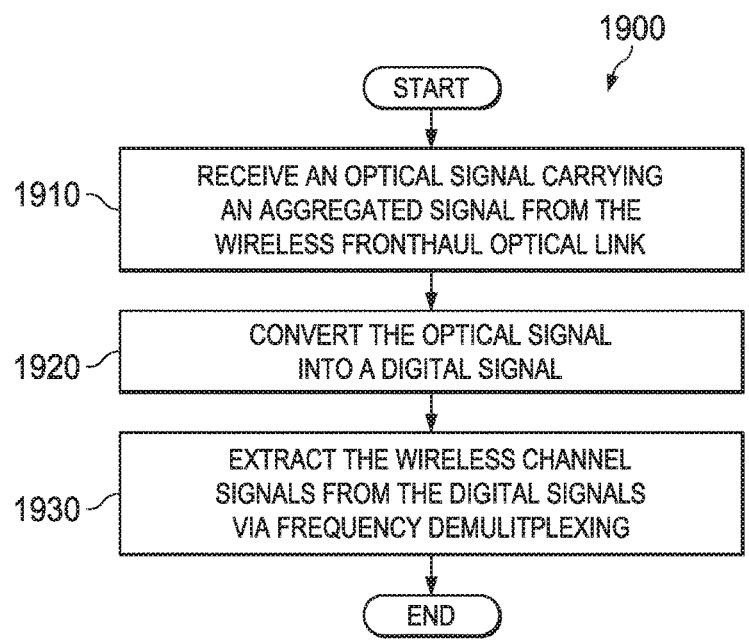
FIG. 19 is a flowchart of another embodiment of a method for channel deaggregation.

FIG. 19 is a flowchart of another embodiment of a method 1900 for channel deaggregation. The method 1900 is implemented by an RRU, such as the RRU 510 and/or 610, and/or a BBU, such as the BBU 521, 620, and 720. The method 1900 is substantially similar to the method 1800. At step 1910, an optical signal carrying an aggregated signal is received from a wireless fronthaul optical link, such as the links 530, 630, and 730. For example, the aggregated signal carries a plurality of wireless channel signals positioned in a plurality of adjacent non-overlapping frequency bands according to a pre-determined channel map. At step 1920, the optical signal is converted into a digital signal, for example, via an optical frontend, such as the optical frontend 655 and 665, and a high-speed ADC, such as the high-speed ADC 654 and 664.

At step 1930, the wireless channel signals are extracted from the aggregated signal via FDM according to the pre-determined channel map. For example, the extraction of the wireless channel associated signals is performed in a digital domain by employing similar FFT and/or IFFT mechanisms as described in the method 1800. Alternatively, the extraction is performed in an analog domain by employing similar mechanisms as in the analog channel deaggregation unit 715 described above. Although the method 1900 is described for a system with a wireless fronthaul optical link, the method 1900 may be applied to a system that employs a cable link or a free-space microwave link, in which different types of signal conversions and transmissions may be performed at steps 1910 and 1920.

Figure 20:
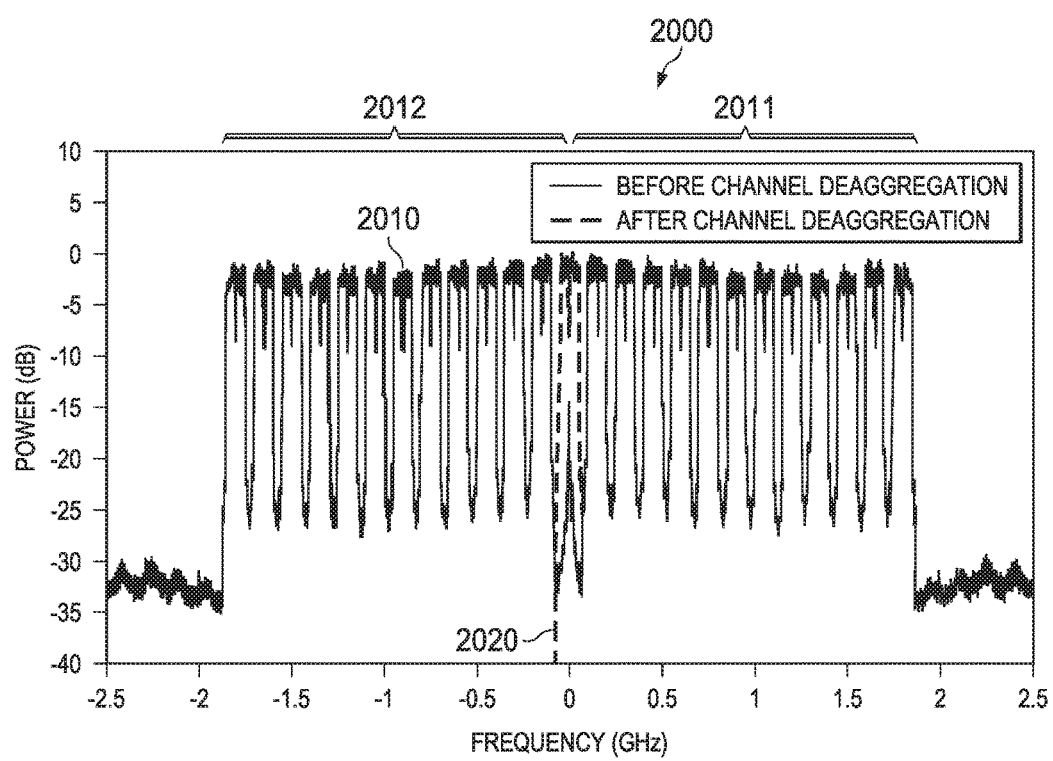
FIG. 20 is a graph illustrating frequency spectra for an aggregated signal before and after channel deaggregation.

FIG. 20 is a graph 2000 illustrating frequency spectra for an aggregated signal before and after channel deaggregation. In the graph 2000, the x-axis represents frequency in units of GHz and the y-axis represents relative power in units of decibel (dB). The plot 2010 shows the frequency spectrum of an aggregated signal produced by a channel aggregation unit, such as the channel aggregation unit 1000. The aggregated signal comprises an aggregation of twelve 100 MHz BW LTE-A-like signals. As shown in the plot 2010, the portion 2011 corresponds to the twelve signals in the positive frequency band, for example, produced at the output of the channel mapper 1020 of the channel aggregation unit 1000. The portion 2012 corresponds to the signal images of the portion 2011, for example, produced at the output of the signal image generator 1030 of the channel aggregation unit 1000.

The plot 2020 shows the frequency spectrum of a deaggregated signal after a channel deaggregation unit, such as the channel deaggregation unit 1100, performs frequency demultiplexing and frequency shifting on the aggregated signal shown in the plot 2010. As shown, the deaggregated signal is centered at 0 Hz with the sample BW, as the original signal carried in the aggregated signal. Thus, the disclosed channel aggregation and channel deaggregation schemes are touchless in terms of maintaining the same BWs.

Figure 21:
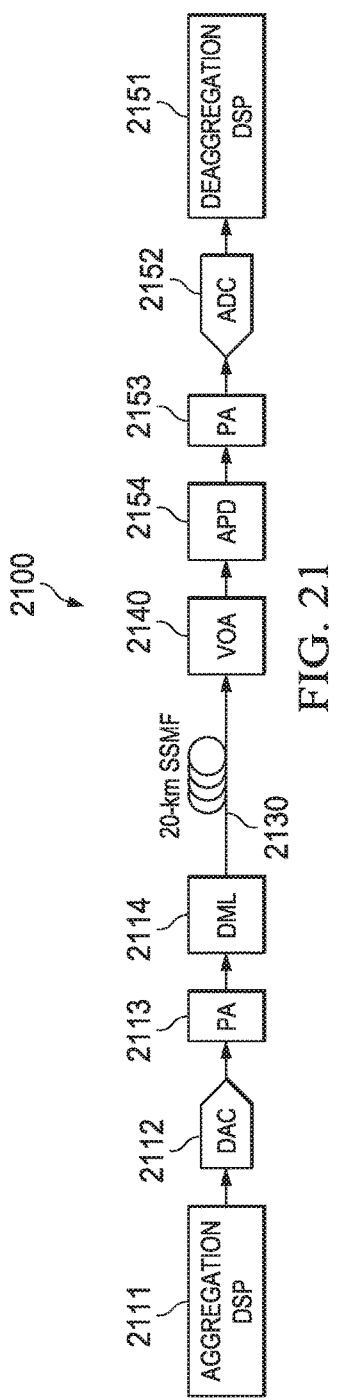
FIG. 21 is a schematic diagram of an embodiment of an experimental setup for an aggregated wireless fronthaul communication system.

FIG. 21 is a schematic diagram of an embodiment of an experimental setup for an aggregated wireless fronthaul communication system 2100. The system 2100 is similar to the system 500 and 600. The system 2100 comprises an aggregation DSP unit 2111, a DAC 2112, a first PA 2113, a DML 2114, an SSMF 2130 comprising a length of about 20 km, a variable optical attenuator (VOA) 2140, an avalanche photodiode (APD) 2154, a second PA 2153, an ADC 2152, and a deaggregation DSP unit 2151. The DAC 2112 is similar to the high-speed DAC 653 and 663. The ADC 2152 is similar to the high-speed ADC 654 and 664. The first PA 2113 and the second PA 2153 are similar to the PAs 617 and 717. The DML 2114 is similar to the laser 619 and 719. The APD 2154 is similar to the PD 418, 618, and 718. The aggregation DSP unit 2111 and the deaggregation DSP 2151 are similar to the BB DSP unit 621.

For example, the channel aggregation DSP unit 2111 generates six E-UTRA-like BB signals for each E-UTRA standard BWs of 1.4 MHz, 3 MHz, 5 MHz, 10 MHz, 15 MHz, and 20 MHz. The signal is based on orthogonal frequency-division multiplexing (OFDM) with 64 quadrature amplitude modulation (64-QAM) for subcarrier modulation. The channel aggregation DSP unit 2111 aggregates the BB signals into an aggregated signal by employing similar mechanisms as described in the channel aggregation units 616, 626, and 1000. For example, the channel maps the BB signals to a plurality of adjacent non-overlapping frequency bands between about 50 MHz to about 550 MHz. The DAC 2112 is coupled to the channel aggregation DSP unit 2111 and configured to convert the aggregated signal into an analog electrical signal. The first PA 2113 is coupled to the DAC 2112 and configured to amplify the analog electrical signal into suitable voltage levels for optical modulation. The DML 2114 is coupled to the first PA 2113 and configured to modulate the analog electrical signal on to an optical signal via a direction modulation scheme. The optical signal is transmitted over the SSMF 2130. The VOA 2140 is coupled to the SSMF 2130. The VOA 2140 is an optical device configured to attenuate an optical signal with variable attenuations. The SSMF 2130 and the VOA 2140 together emulate an optical link, such as the link 530 and 630 between the RRU and the BBU.

The APD 2154 is coupled to the VOA 2140 and configured to convert the optical signal that carries the aggregated signal into an analog electrical signal. The second PA 2153 is configured to amplify the analog electrical signal into voltage levels suitable for optical receiver processing. The ADC 2152 is coupled to the second PA 2153 and configured to convert the analog electrical signal into a digital signal. The deaggregation DSP unit 2151 is coupled to the ADC 2152 and configured to perform channel deaggregation, similar to the channel deaggregation operations in the channel deaggregation units 625, 615, and 1100, to extract the 36 E-UTRA BB signals from the received aggregated signal.

Figure 22:
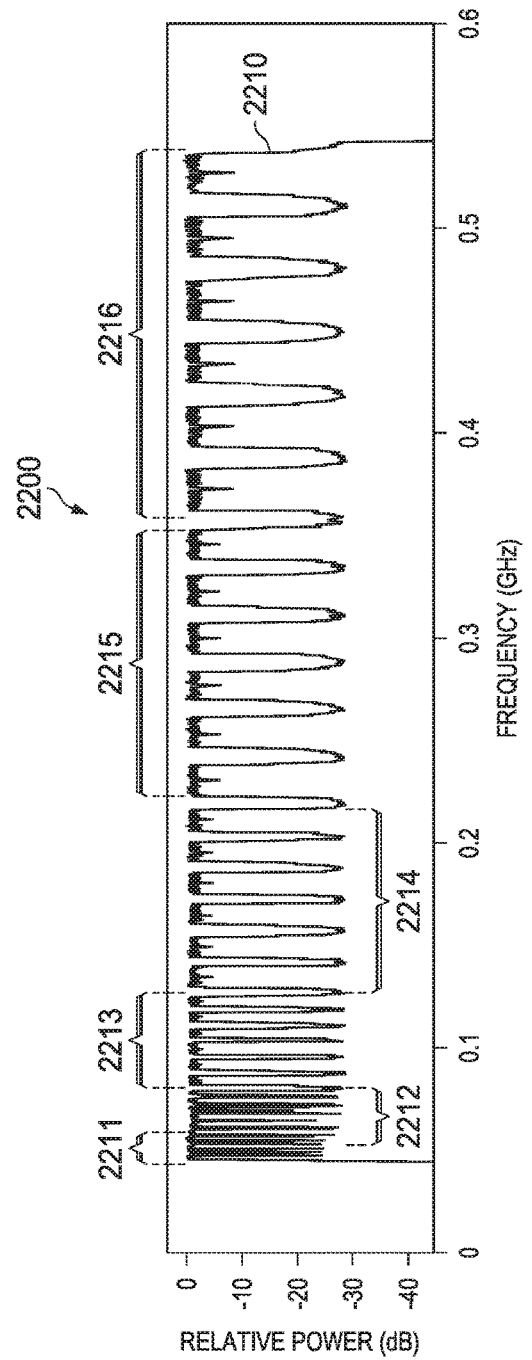
FIG. 22 is a graph illustrating a frequency spectrum for an aggregated signal generated by the system of FIG. 21.

FIG. 22 is a graph 2200 illustrating a frequency spectrum for an aggregated signal generated by the system 2100. In the graph 2200, the x-axis represents frequency in units of GHz and the y-axis represents relative power in units of dB. The plot 2210 shows the frequency spectrum of an aggregated signal produced at the output of the DAC 2112. The portions 2211, 2212, 2213, 2214, 2215, and 2216 correspond to the 1.4 MHz signals, the 3 MHz signals, the 5 MHz signals, the 10 MHz signals, the 15 MHz signals, and the 20 MHz signals, respectively.

Figure 23:
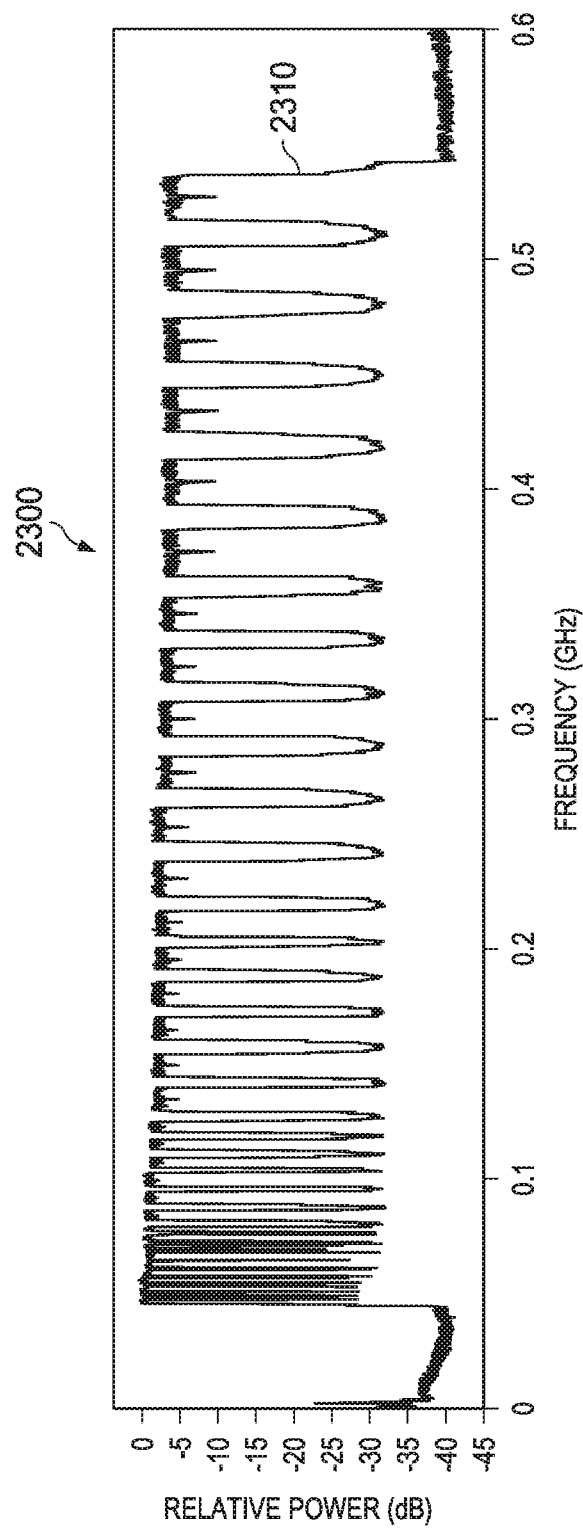
FIG. 23 is a graph illustrating a frequency spectrum for an aggregated signal measured at the system of FIG. 21.

FIG. 23 is a graph 2300 illustrating a frequency spectrum for an aggregated signal measured at the system 2100. In the graph 2300, the x-axis represents frequency in units of GHz and the y-axis represents relative power in units of dB. The plot 2310 shows a frequency spectrum measured at the output of the ADC 2152 prior to channel deaggregation. By comparing the plots 2310 and 2210, the plot 2310 shows attenuation at high frequencies, which may be caused by the optical components, such as the SSMF 2130 and the VOA 2140. The frequency response shown in the plot 2310 may be similar to actual optical fiber link in a wireless fronthaul system, such as the systems 500, 600, and 700.

Figure 24A:
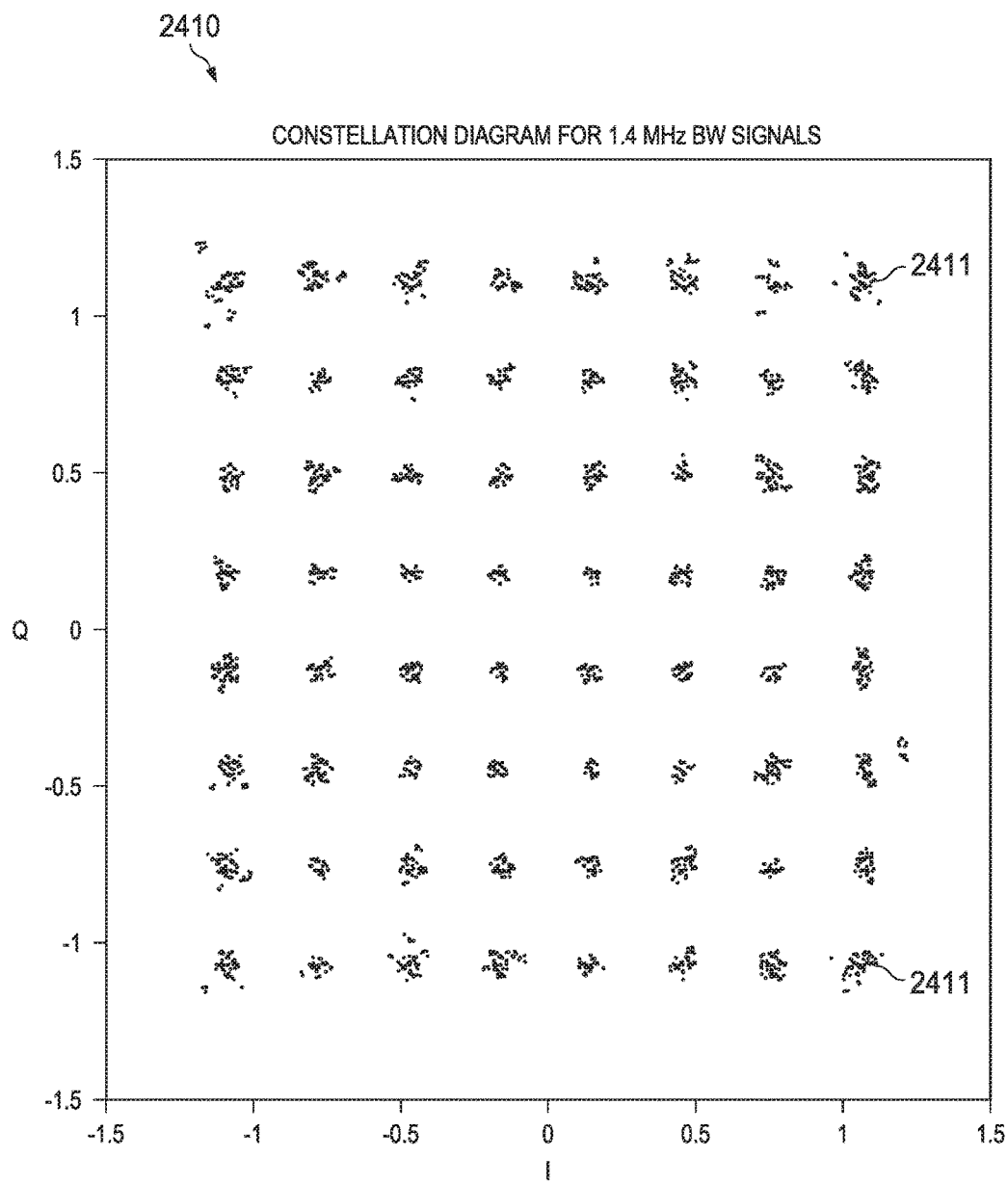
FIG. 24A is a graph illustrating a constellation plot for the 1.4 megahertz (MHz) bandwidth (BW) channels captured from the system of FIG. 21.

FIGS. 24A-F illustrate constellation plots captured from the system 2100. In the FIGS. 24A-F, the x-axis represents I components and the y-axis represents Q components, where the x-axis and the y-axis may be in some constant units. FIG. 24A is a graph 2410 illustrating a constellation plot for the 1.4 MHz BW channels captured from the system 2100. The constellation points 2411 correspond to the 64-QAM constellation points for the 1.4 MHz BW signals captured at the deaggregation DSP unit 2151 after channel deaggregation.

Figure 24B:
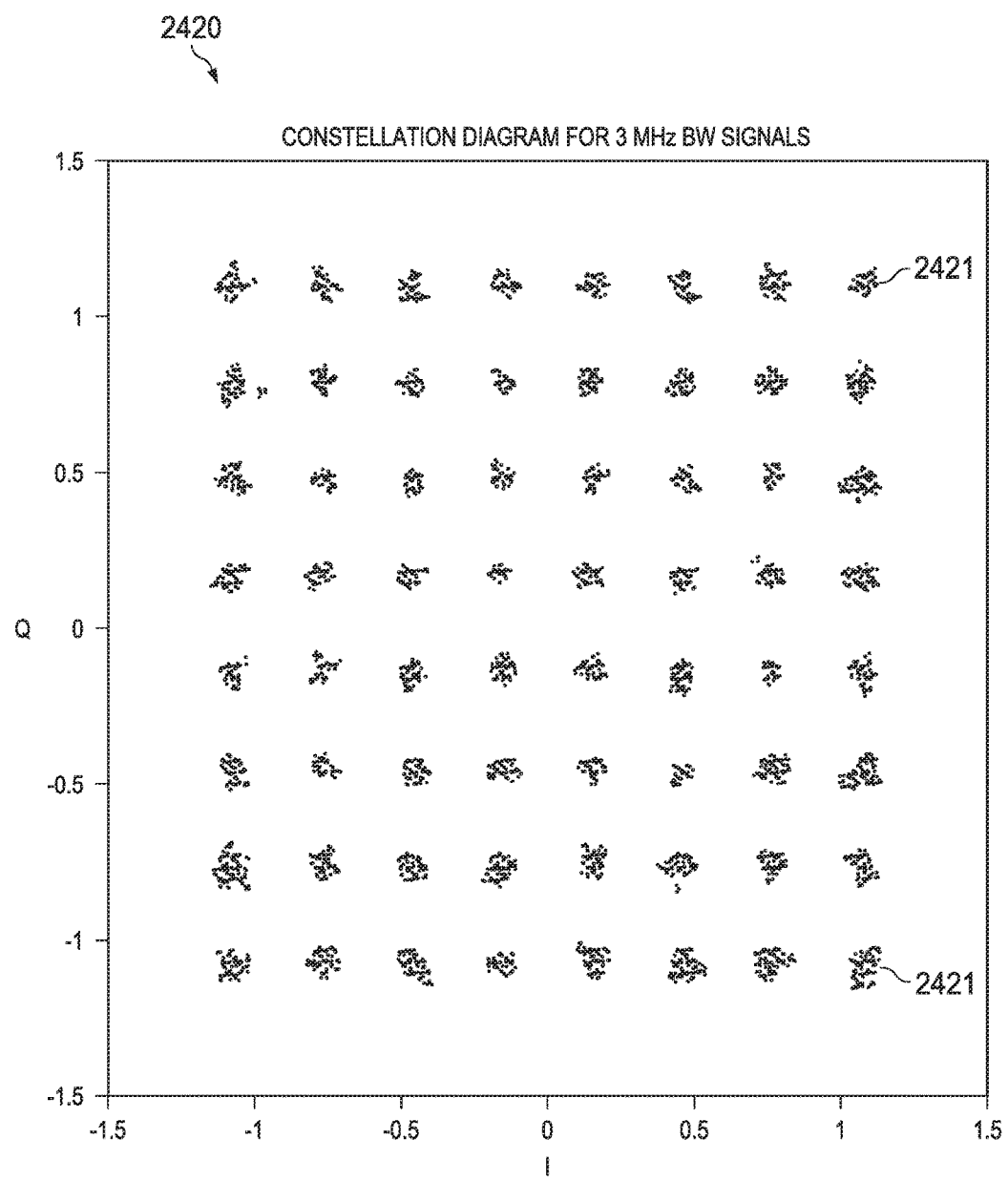
FIG. 24B is a graph illustrating a constellation plot for the 3 MHz BW channels captured from the system of FIG. 21.

FIG. 24B is a graph 2420 illustrating a constellation plot for the 3 MHz BW channels captured from the system 2100. The constellation points 2421 correspond to the 64-QAM constellation points for the 3 MHz BW signals captured at the deaggregation DSP unit 2151 after channel deaggregation.

Figure 24C:
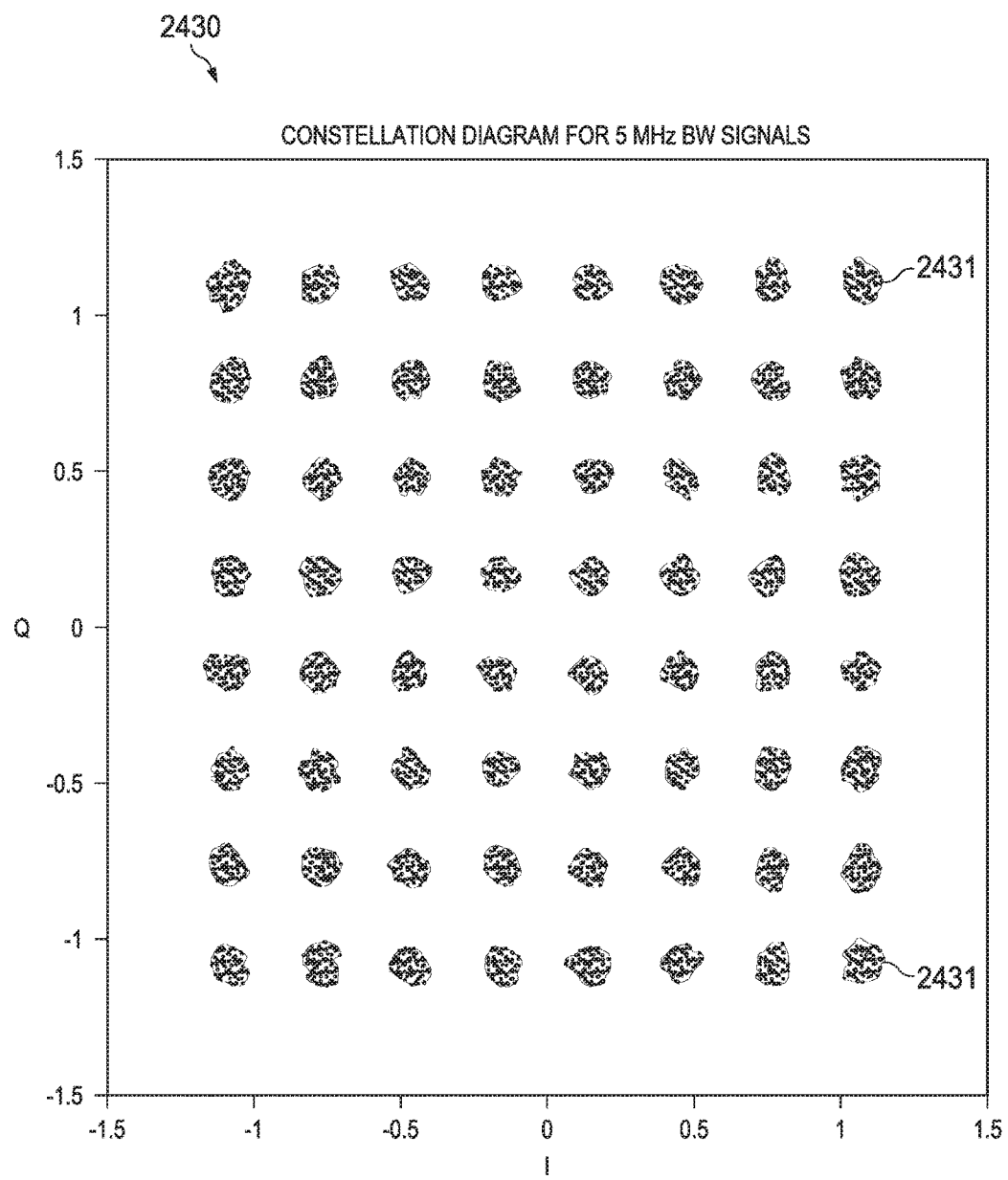
FIG. 24C is a graph illustrating a constellation plot for the 5 MHz BW channels captured from the system of FIG. 21.

FIG. 24C is a graph 2430 illustrating a constellation plot for the 5 MHz BW channels captured from the system 2100. The constellation points 2431 correspond to the 64-QAM constellation points for the 5 MHz BW signals received at the deaggregation DSP unit 2151 after channel deaggregation.

Figure 24D:
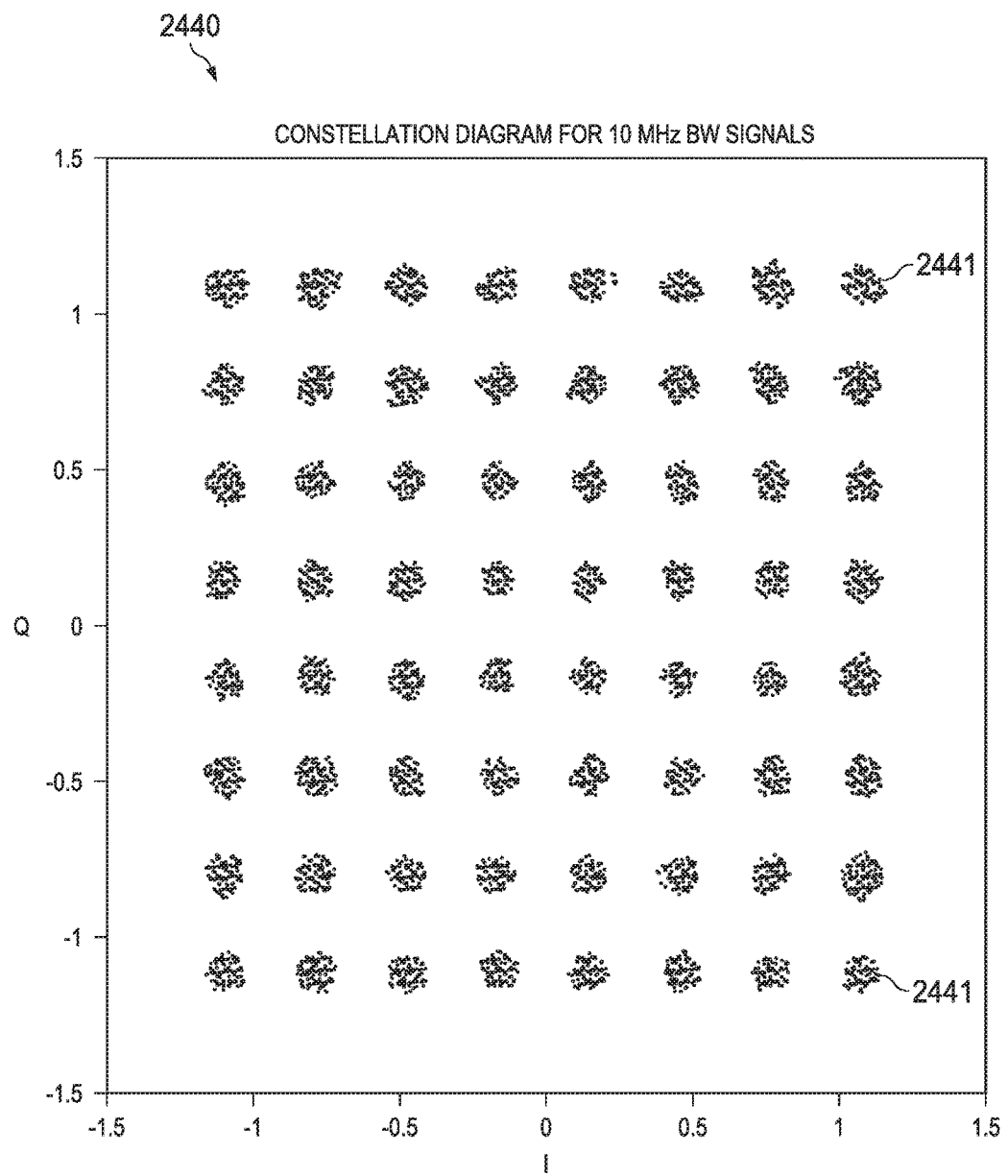
FIG. 24D is a graph illustrating a constellation plot for the 10 MHz BW channels captured from the system of FIG. 21.

FIG. 24D is a graph 2440 illustrating a constellation plot for the 10 MHz BW channels captured from the system 2100. The constellation points 2441 correspond to the 64-QAM constellation points for the 10 MHz BW signals captured at the deaggregation DSP unit 2151 after channel deaggregation.

Figure 24E:
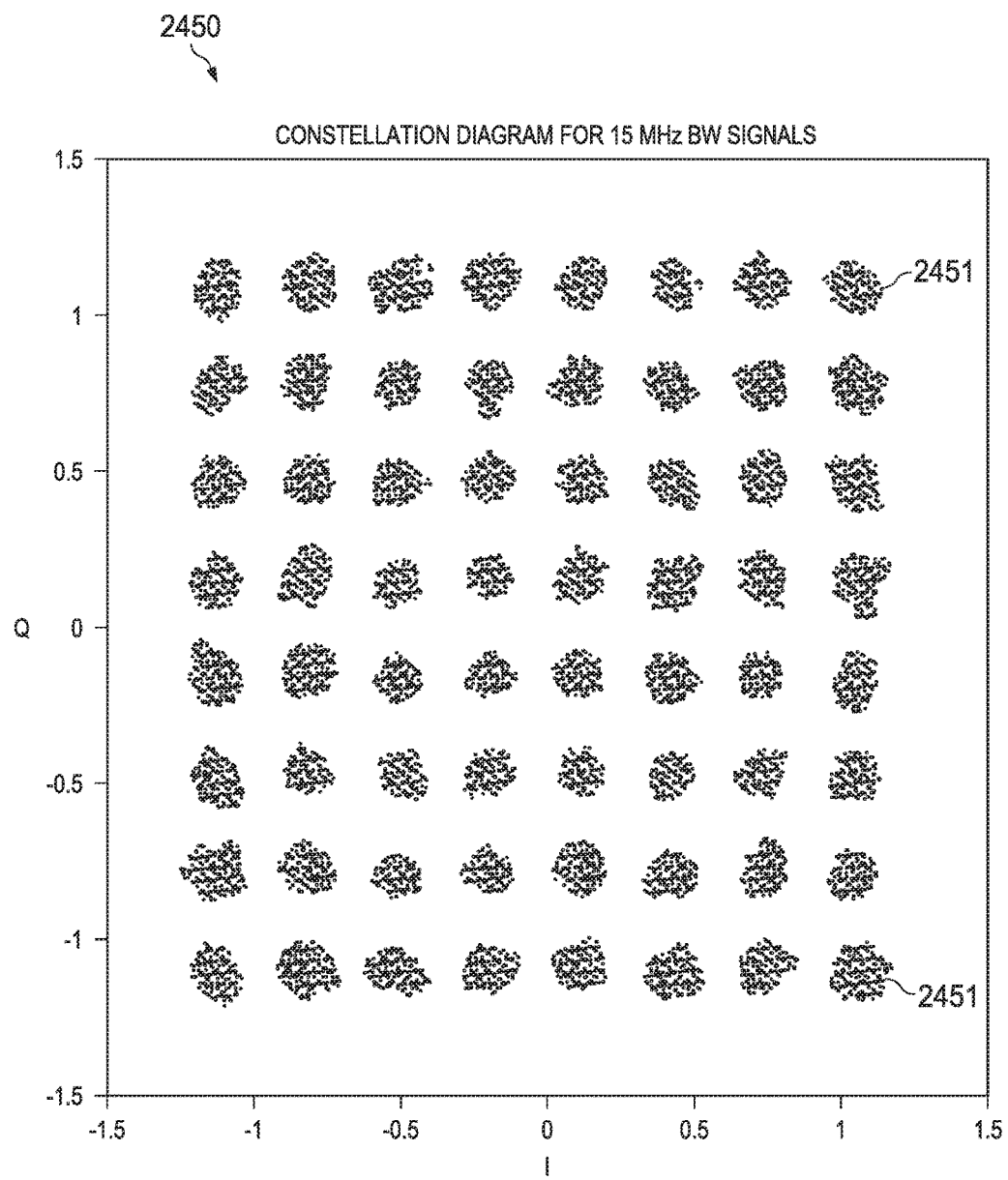
FIG. 24E is a graph illustrating a constellation plot for the 15 MHz BW channels captured from the system of FIG. 21.

FIG. 24E is a graph 2450 illustrating a constellation plot for the 15 MHz BW channels captured from the system 2100. The constellation points 2451 correspond to the 64-QAM constellation points for the 15 MHz BW signals captured at the deaggregation DSP unit 2151 after channel deaggregation.

Figure 24F:
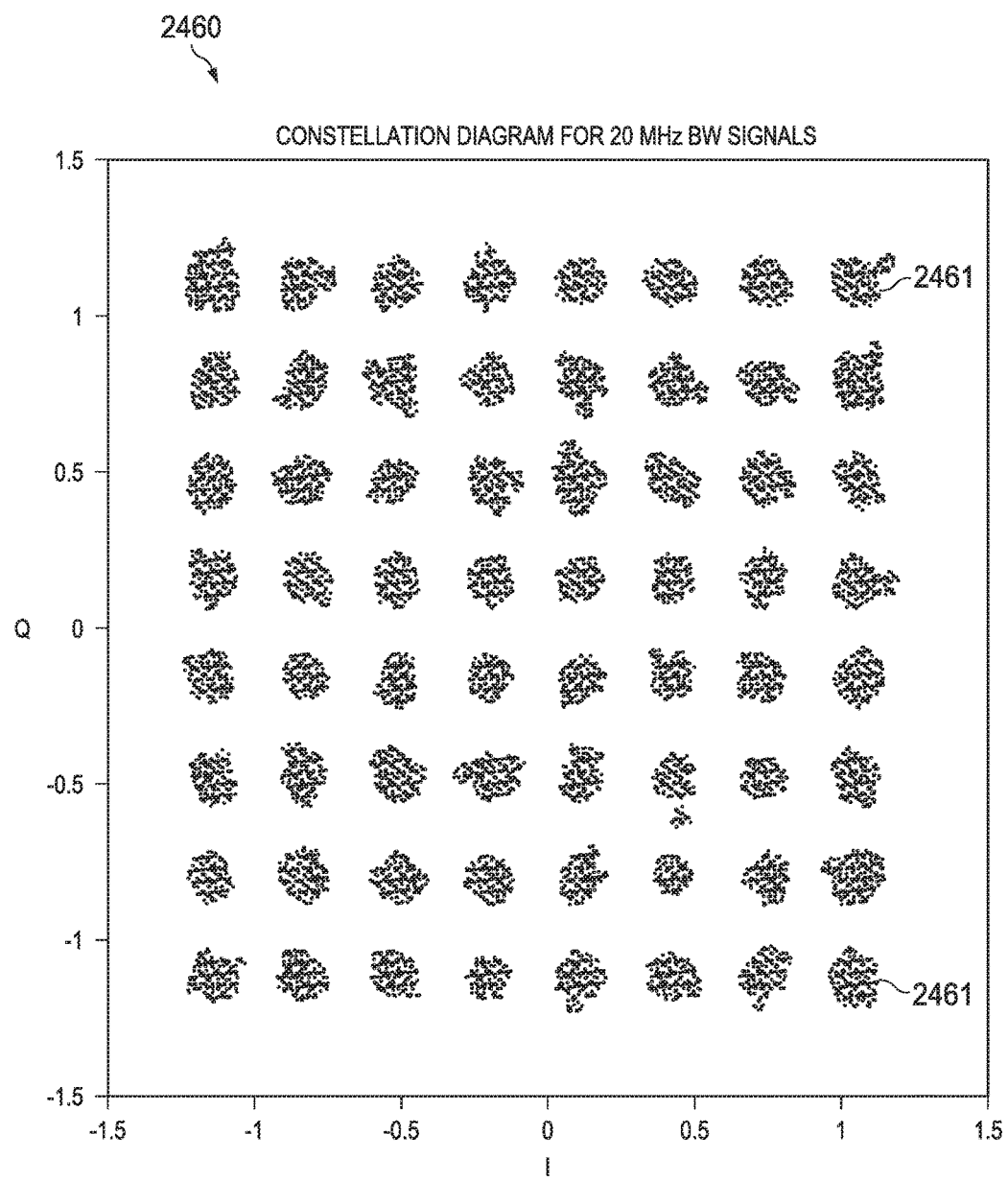
FIG. 24F is a graph illustrating a constellation plot for the 20 MHz BW channels captured from the system of FIG. 21.

FIG. 24F is a graph 2460 illustrating a constellation plot for the 20 MHz BW channels captured from the system 2100. The constellation points 2461 correspond to the 64-QAM constellation points for the 20 MHz BW signals captured at the deaggregation DSP unit 2151 after channel deaggregation.

As shown in FIGS. 24A-24F, each of the graphs 2410-2460 shows 64 distinct groups of constellation points, separated by substantial distances. However, the separation distances decrease as the BW increases, for example, the separation distances for the constellation points 2461 for the 20 MHz signals are substantially less than the separations distances for the constellation points 2431 for the 5 MHz signals. The smaller separation distances at the higher BWs are because the constellation points 2411-2461 are obtained during a fixed time period, in which a greater number of symbols are received for the higher BW signals, and thus higher signal distortions are captured. Higher frequency signals may experience higher attenuation due to the bandwidth limitations of the system 2100, as shown in the graph 2300. In some embodiments, channel pre-equalization may be performed prior to transmission to equalize the frequency response of the system, for example, pre-equalizing the frequency response of the optical channel provided by an optical fiber link, such as the links 530, 630, and 730.

Figure 25:
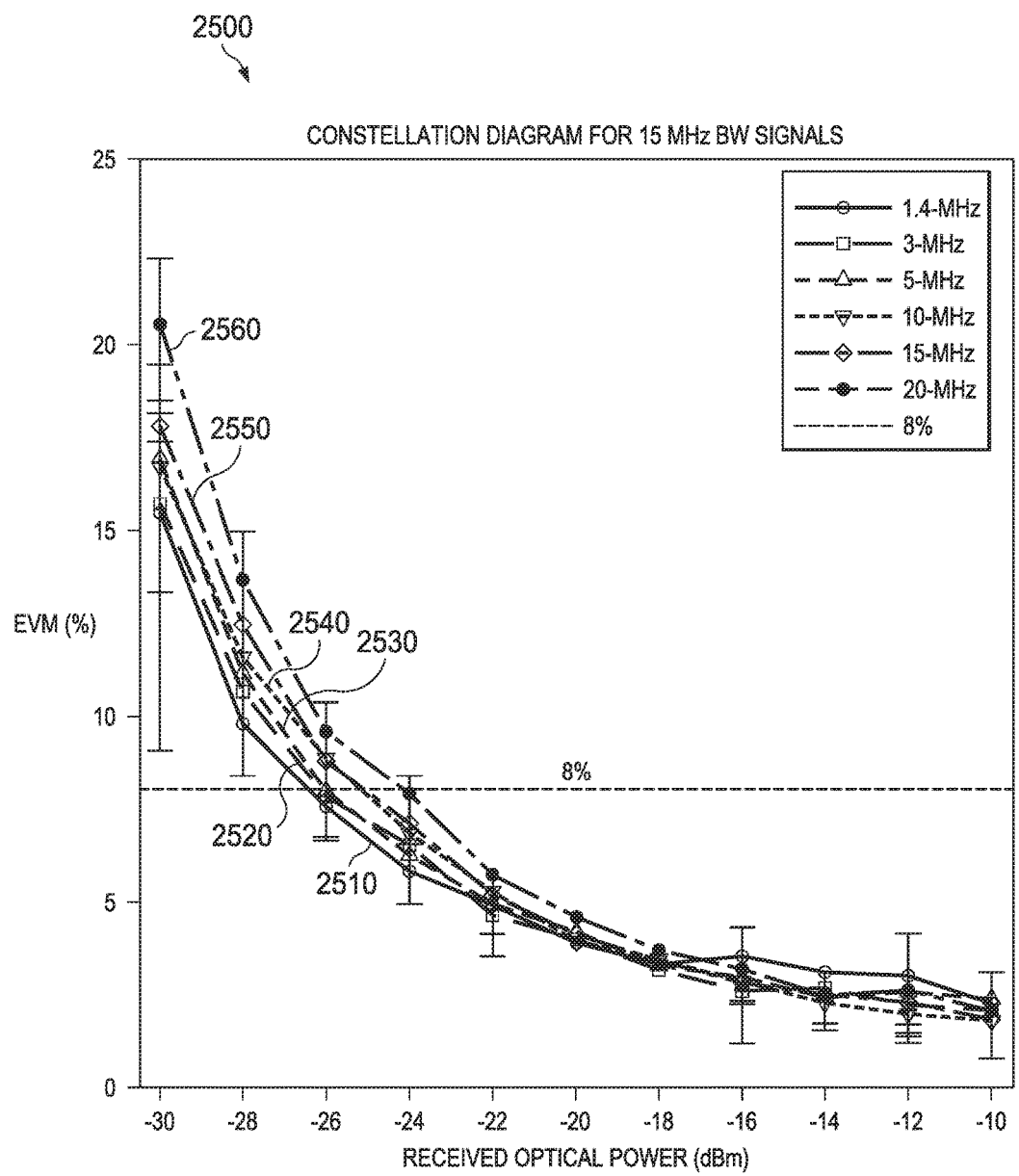
FIG. 25 is a graph illustrating error vector magnitudes (EVMs) measured at the system of FIG. 21.

FIG. 25 is a graph 2500 illustrating error vector magnitudes (EVMs) measured at the system 2100 after transmission over the 20 km SSMF 2130. EVM is a measure of distances between actual received symbols and the original generated symbols. In the graph 2500, the x-axis represents EVM in units of percentage (%) and the y-axis represents optical power in units of decibel-milliwatt (dBm). The plot 2510 corresponds to the EVM for the 64-QAM signal in the 1.4 MHz BW as a function of optical power. The plot 2520 corresponds to the EVM for the 64-QAM signal in the 3 MHz BW as a function of optical power. The plot 2530 corresponds to the EVM for the 64-QAM signal in the 5 MHz BW as a function of optical power. The plot 2540 corresponds to the EVM for the 64-QAM signal in the 10 MHz BW as a function of optical power. The plot 2550 corresponds to the EVM for the 64-QAM signal in the 15 MHz BW as a function of optical power. The plot 2560 corresponds to the EVM for the 64-QAM signal in the 20 MHz BW as a function of optical power. As shown, for an 8% EVM threshold, a received optical power of about −24 dBm is sufficient for all the different channel bandwidths with about 20 km of fiber transmission.

Figure 26:
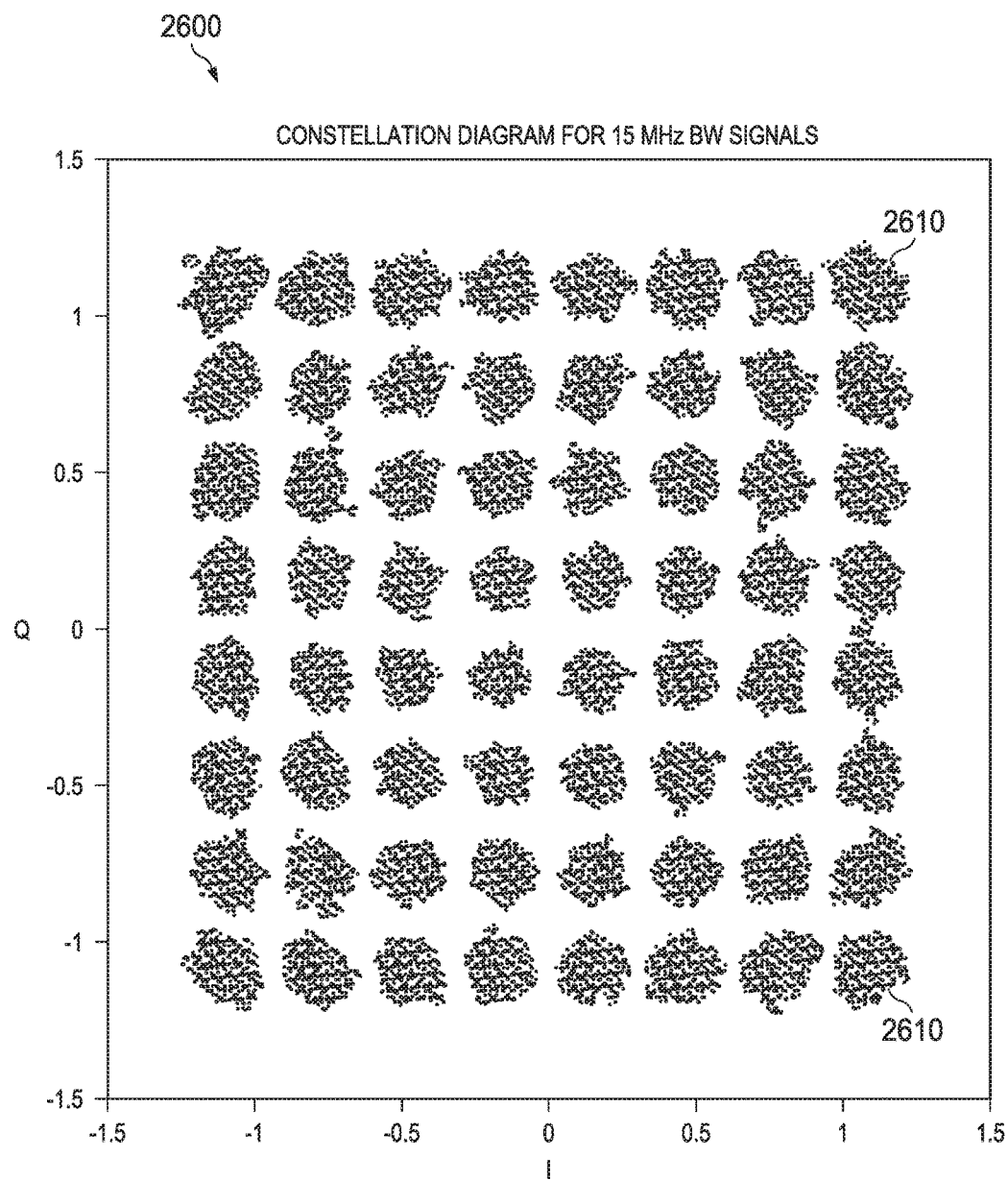
FIG. 26 is a graph illustrating a constellation plot for the 1.4 MHz, 3 MHz, 5 MHz, 10 MHz, 15 MHz, and 20 MHz BW channels captured from the system of FIG. 21.

FIG. 26 is a graph 2600 illustrating a constellation plot for the 1.4 MHz, 3 MHz, 5 MHz, 10 MHz, 15 MHz, and 20 MHz BW channels captured from the system 2100. In the graph 2600, the x-axis represents I components and the y-axis represents Q components, where the x-axis and the y-axis may be in some constant units. The constellation points 2610 correspond to the 64-QAM constellation points for the 1.4 MHz, 3 MHz, 5 MHz, 10 MHz, 15 MHz, and 20 MHz BW signals captured at the deaggregation DSP unit 2151 after channel deaggregation, where the received optical power for the signals is at about −20 dBm. As shown, the constellation points 2610 show 64 distinct groups, thus the original transmitted data may be recovered from the received signals.

To further improve optical BW efficiency and cost, the disclosed embodiments may apply wavelength-division multiplexing (WDM) techniques to further multiplex multiple aggregated channels onto a single optical carrier signal for transmission over a single optical fiber link. In addition, the disclosed embodiments may be employed to aggregate wireless channels from different wireless communication protocols and may employ samples stuffing for synchronization and/or fine-tuning to support various sampling rates. Sample stuffing refers to adding additional samples to a signal, for example, with zero values.

Figure 27:
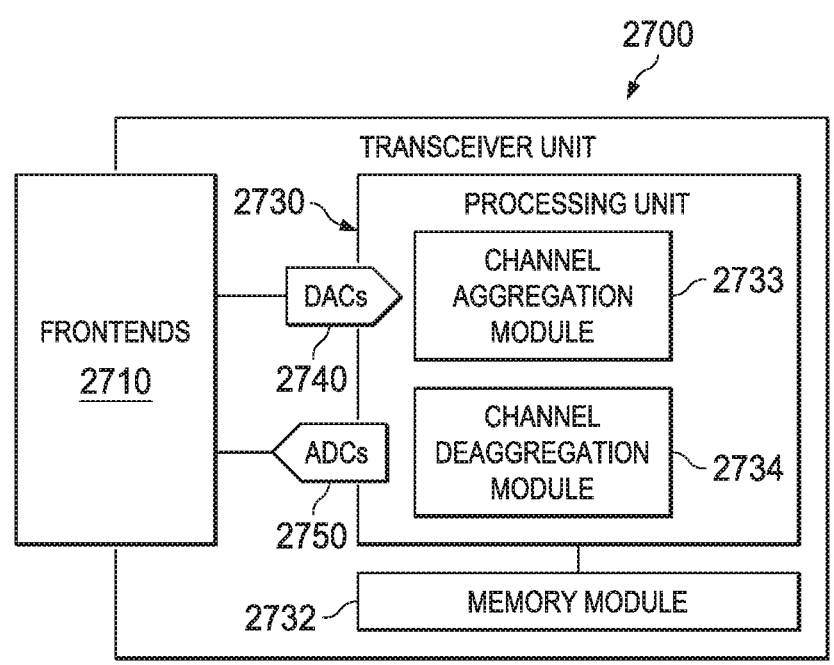
FIG. 27 is a schematic diagram of an embodiment of a wireless fronthaul transceiver unit.

FIG. 27 is a schematic diagram of an embodiment of a wireless fronthaul transceiver unit 2700, which may be any device that transmits and/or receives optical signals and/or RF signals. For example, the transceiver unit 2700 may be located in an optical communication device, such as the RRU 510, 610, and 710, and/or the BBU 521, 620, and 720 in a wireless fronthaul communication network and system, such as the wireless fronthaul communication system 500, 600, and 700. The transceiver unit 2700 may also be configured to implement or support any of the channel aggregation and deaggregation schemes described herein, such as the methods 1600, 1700, 1800, and 1900. One skilled in the art will recognize that the term "transceiver unit" encompasses a broad range of devices of which transceiver unit 2700 is merely an example. The transceiver unit 2700 is included for purposes of clarity of discussion, but is in no way meant to limit the application of the present disclosure to a particular transceiver unit embodiment or class of transceiver unit embodiments. At least some of the features and methods described in the disclosure may be implemented in a network apparatus or component such as a transceiver unit 2700. For instance, the features and methods in the disclosure may be implemented using hardware, firmware, and/or software installed to run on hardware. As shown in FIG. 27, the transceiver unit 2700 may comprise a plurality of frontends 2710. The frontends 2710 may comprise an optical frontend and/or a RF frontend. For example, an optical frontend may be similar to the optical frontend 655 and 665 and may comprise E/O components and/or O/E components, which may convert an electrical signal to an optical signal for transmission in a wireless fronthaul optical network and/or receive an optical signal from the wireless fronthaul network and convert the optical signal to an electrical signal, respectively. The RF frontend may comprise RF components, RF devices, and/or RF interfaces, such as the RRHI 511, which may receive and transmit wireless RF signals. A processing unit 2730 may be coupled to the frontends 2710 via a plurality of DACs 2740 and ADCs 2750. For example, the DACs 2740 may be similar to the DACs 413 and 613, and/or the high-speed DACs 653 and/or 663. The ADCs 2750 may be similar to the ADCs 414 and 614, and/or the high-speed ADCs 654 and/or 664. The DACs 2740 may convert digital electrical signals generated by the processing unit 2730 into analog electrical signals that may be fed into the frontend 2710. The ADCs 2750 may convert analog electrical signals received from the frontends 2710 into digital electrical signals that may be processed by the processing unit 2730. In some embodiments, the ADCs 2750 and the DACs 2740 may be integrated with the processing unit 2730. The processing unit 2730 may comprise one or more processors, which may include general processors, single-core processors, multi-core processors, application specific integrated circuits (ASICs), and/or DSPs. The processing unit 2730 may comprise a channel aggregation module 2733, which may implement the methods 1600 and 1700, and a channel deaggregation module 2734, which may implement the methods 1800 and 1900. In an alternative embodiment, the channel aggregation 2733 and the channel deaggregation module 2734 may be implemented as instructions stored in the memory module 2732, which may be executed by the processing unit 2730. The memory module 2732 may comprise a cache for temporarily storing content, e.g., a random-access memory (RAM). Additionally, the memory module 2732 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof.

It is understood that by programming and/or loading executable instructions onto the transceiver unit 2700, at least one of the processing unit 2730 and/or memory module 2732 are changed, transforming the transceiver unit 2700 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design, numbers of units to be produced, and/or clock speed requirements rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

It should be understood that any processing of the present disclosure may be implemented by causing a processor (e.g., a general purpose central processing unit (CPU) inside a computer system) in a computer system to execute a computer program. In this case, a computer program product can be provided to a computer or a mobile device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), compact disc read only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a receiver configured to:
receive over a single optical fiber link an optical signal carrying an aggregated signal comprising a plurality of wireless channel signals; and
convert the optical signal into an analog electric signal, the plurality of wireless channel signals being positioned in different non-overlapping frequency bands and spanning respective channel bandwidths (BWs), a first channel BW of the respective channel BWs being different from a second channel BW of the respective channel BWs;
an analog-to-digital converter (ADC) coupled to the receiver and configured to convert the analog electric signal into a digital signal; and
a digital signal processor (DSP) coupled to the ADC and configured to extract the plurality of wireless channel signals from the digital signal, the extracted plurality of wireless channel signals having the respective channel BWs.

2. The apparatus of claim 1, wherein the first channel BW corresponds to a first sampling rate of a first wireless channel signal of the plurality of wireless channel signals, the second channel BW corresponds to a second sampling rate of a second wireless channel signal of the plurality of wireless channel signals; wherein the first sampling rate is different from the second sampling rate.

3. The apparatus of claim 1, wherein the plurality of wireless channel signals are a plurality of wireless uplink (UL) channel signals; wherein the DSP is further configured to aggregate a plurality of wireless downlink (DL) channel signals to produce an aggregated DL signal via frequency-domain mapping (FDM), wherein the wireless DL channel signals are positioned in different second frequency bands with unchanged channel BWs in the aggregated DL signal.

4. The apparatus of claim 1, wherein the plurality of wireless channel signals comprise wireless channel signals that span BWs of at least one of 1.4 megahertz (MHz), 3 MHz, 5 MHz, 10 MHz, 15 MHz, or 20 MHz.

5. The apparatus of claim 1, wherein the DSP is further configured to extract the plurality of wireless channel signals from the digital signal via channel deaggregation based on a channel map, wherein the channel map comprises a mapping of the plurality of wireless channel signals to the different non-overlapping frequency bands.

6. A method for wireless channel signals processing, comprising:
receiving over a single optical fiber link an optical signal carrying an aggregated signal comprising a plurality of wireless channel signals;
converting the optical signal into an analog electric signal, the plurality of wireless channel signals being positioned in different non-overlapping frequency bands and spanning respective channel bandwidths (BWs), a first channel BW of the respective channel BWs being different from a second channel BW of the respective channel BWs;
converting the analog electric signal into a digital signal; and
extracting the plurality of wireless channel signals from the digital signal, the exacted plurality of wireless channel signals having the respective channel BWs.

7. The method of claim 6, wherein the first channel BW corresponds to a first sampling rate of a first wireless channel signal of the plurality of wireless channel signals, the second channel BW corresponds to a second sampling rate of a second wireless channel signal of the plurality of wireless channel signals; wherein the first sampling rate is different from the second sampling rate.

8. The method of claim 6, wherein the plurality of wireless channel signals are a plurality of wireless uplink (UL) channel signals; and wherein the method further comprises aggregating a plurality of wireless downlink (DL) channel signals to produce an aggregated DL signal via frequency-domain mapping (FDM), wherein the wireless DL channel signals are positioned in different second frequency bands with unchanged channel BWs in the aggregated DL signal.

9. The method of claim 6, wherein the plurality of wireless channel signals comprise wireless channel signals that span BWs of at least one of 1.4 megahertz (MHz), 3 MHz, 5 MHz, 10 MHz, 15 MHz, or 20 MHz.

10. The method of claim 6, further comprising: extracting the plurality of wireless channel signals from the signal via channel deaggregation based on a channel map, wherein the channel map comprises a mapping of the plurality of wireless channel signals to the different non-overlapping frequency bands.

11. An apparatus comprising:
a baseband digital signal processor (DSP) that generates a plurality of wireless channel signals;
a digital to analog converter (DAC); and
a digital channel aggregation processor that is coupled between the baseband DSP and the DAC and configured to:
receive the plurality of wireless channel signals of the different wireless channels, the plurality of wireless channel signals comprising respective channel bandwidths (BWs), a first channel BW of the respective channel BWs being different from a second channel BW of the respective channel BWs;
perform a channel aggregation in a digital domain on the plurality of wireless channel signals to produce an aggregated signal in which the plurality of wireless channel signals are positioned in different non-overlapping frequency bands of the aggregated signal, wherein the aggregated signal comprises a first channel signal and a second channel signal, the first channel signal being positioned in a first frequency band of the different non-overlapping frequency bands and having the first channel BW, and the second channel signal being positioned in a second frequency band of the different non-overlapping frequency bands and having the second channel BW,
wherein the digital channel aggregation processor comprises multiple fast Fourier transformers (FFTs) for respective wireless channels and a single inverse fast Fourier transformer (IFFT),
wherein the digital channel aggregation processor is further configured to process samples output by the single IFFT such that for every M samples output by the single IFFT, a center M-L samples are kept, where L is an overlap length, M is a size of the single IFFT.

12. The apparatus of claim 11, wherein the first channel BW corresponds to a first sampling rate of a first wireless channel signal of the plurality of wireless channel signals, the second channel BW corresponds to a second sampling rate of a second wireless channel signal of the plurality of wireless channel signals; wherein the first sampling rate is different from the second sampling rate.

13. The apparatus of claim 11, wherein the plurality of wireless channel signals comprise wireless channel signals that span BWs of at least one of 1.4 megahertz (MHz), 3 MHz, 5 MHz, 10 MHz, 15 MHz, or 20 MHz.

14. The apparatus of claim 1, wherein the DSP is configured to extract the plurality of wireless channel signals by:
performing a Fourier transform processing on the digital signal to produce a frequency-domain signal;
performing channel demapping on the frequency-domain signal to produce a plurality of channel-demapped signals corresponding to the plurality of wireless channels; and
performing, using a plurality of inverse Fourier transformers, an inverse Fourier transform processing on the plurality of channel-demapped signals to produce the wireless uplink (UL) channel signals, the plurality of inverse Fourier transformers comprising a first inverse Fourier transformer and a second inverse Fourier transformer, the first inverse Fourier transformer having a first size that corresponds to a first wireless channel signal having the first channel BW and the second inverse Fourier transformer having a second size that corresponds to a second wireless channel signal having the second channel BW.

15. The apparatus of claim 1, wherein more than one first wireless channel signals corresponding to a first sampling rate and the first channel BW are positioned in a first frequency band of the different non-overlapping frequency bands, and wherein more than one second wireless channel signals corresponding to a second sampling rate and the second channel BW are positioned in a first frequency band of the different non-overlapping frequency bands.

16. The method of claim 6, wherein the plurality of wireless channel signals are extracted by:
performing a Fourier transform processing on the digital signal to produce a frequency-domain signal;
performing channel demapping on the frequency-domain signal to produce a plurality of channel-demapped signals corresponding to the plurality of wireless channels; and
performing, using a plurality of inverse Fourier transformers, an inverse Fourier transform processing on the plurality of channel-demapped signals to produce the wireless uplink (UL) channel signals, the plurality of inverse Fourier transformers comprising a first inverse Fourier transformer and a second inverse Fourier transformer, the first inverse Fourier transformer having a first size that corresponds to a first wireless channel signal having the first channel BW and the second inverse Fourier transformer having a second size that corresponds to a second wireless channel signal having the second channel BW.

17. The method of claim 6, wherein the method is performed by a baseband unit (BBU) or a remote radio unit (RRU), the RRU and the BBU being communicatively coupled via an optical link.

18. The apparatus of claim 11, wherein more than one first wireless channel signals corresponding to a first sampling rate and the first channel BW are positioned in a first frequency band of the different non-overlapping frequency bands, and wherein more than one second wireless channel signals corresponding to a second sampling rate and the second channel BW are positioned in a first frequency band of the different non-overlapping frequency bands.

19. The apparatus of claim 11, wherein, the digital channel aggregation processor comprises:
a plurality of discrete Fourier transformers (DFTs) that process the plurality of wireless channel signals received from the baseband DSP;
a channel mapper that maps signals from the plurality of DFTs to the different non-overlapping frequency bands; and
a single inverse discrete Fourier transformer (IDFT) that is coupled to the channel mapper and performs an inverse discrete Fourier transform processing to output the aggregated signal.

* * * * *

UNITED STATES PATENT AND TRADEMARK OFFICE
CERTIFICATE OF CORRECTION

PATENT NO. : 10,374,764 B2
APPLICATION NO. : 15/625796
DATED : August 6, 2019
INVENTOR(S) : Xiang Liu et al.

It is certified that error appears in the above-identified patent and that said Letters Patent is hereby corrected as shown below:

In the Claims

Column 31, Lines 51-67, Claim 6, should read:
6. A method for wireless channel signals processing, comprising:
 receiving over a single optical fiber link an optical signal carrying an aggregated signal comprising a plurality of wireless channel signals;
 converting the optical signal into an analog electric signal, the plurality of wireless channel signals being positioned in different non-overlapping frequency bands and spanning respective channel bandwidths (BWs), a first channel BW of the respective channel BWs being different from a second channel BW of the respective channel BWs;
 converting the analog electric signal into a digital signal; and
 extracting the plurality of wireless channel signals from the digital signal, the extracted plurality of wireless channel signals having the respective channel BWs.

Signed and Sealed this
First Day of October, 2019

Andrei Iancu
*Director of the United States Patent and Trademark Office*